(12) United States Patent
Suzuki et al.

(10) Patent No.: US 7,805,328 B2
(45) Date of Patent: Sep. 28, 2010

(54) METHOD AND SYSTEM OF MANAGING PRODUCTION QUANTITY

(75) Inventors: Yuya Suzuki, Chiba-ken (JP); Takashi Watanuki, Ibaraki-ken (JP); Masayuki Kawakami, Saitama-ken (JP); Hiroshi Saito, Chiba-ken (JP); Takumi Otani, Saitama-ken (JP)

(73) Assignee: Hoya Corporation, Tokyo (JP)

( * ) Notice: Subject to any disclaimer, the term of this patent is extended or adjusted under 35 U.S.C. 154(b) by 1925 days.

(21) Appl. No.: 10/773,239

(22) Filed: Feb. 9, 2004

(65) Prior Publication Data

US 2004/0162769 A1 Aug. 19, 2004

(30) Foreign Application Priority Data

Feb. 10, 2003 (JP) .............................. 2003-033014

(51) Int. Cl.
  *G06Q 10/00* (2006.01)
(52) U.S. Cl. ............................................. 705/10; 705/7
(58) Field of Classification Search .................... 705/7
  See application file for complete search history.

(56) References Cited

U.S. PATENT DOCUMENTS 6,151,582 A * 11/2000 Huang et al. .................. 705/8
6,611,726 B1 * 8/2003 Crosswhite ................. 700/99
6,816,839 B1 * 11/2004 Gung et al. ................. 705/10

FOREIGN PATENT DOCUMENTS

| JP | 7-164267 | 6/1995 |
| JP | 2000-322483 | 11/2000 |
| JP | 2002-179218 | 6/2002 |

OTHER PUBLICATIONS

"A spreadsheet modeling approach to the Holt-Winters optimal forecasting", JV Segura, E Vercher—European Journal of Operational Research, 2001—Elsevier.*
Evaluation of forecasting methods for intermittent parts demand in the field of aviation: AA Ghobbar, CH Friend—Computers and Operations Research, 2003—Elsevier.*
Designing ordering and inventory management methodologies for purchased parts A Looman, FAJ Ruffini, L Boer—The Journal of Supply Chain Management, 2002—doc.utwente.nl.*

* cited by examiner

*Primary Examiner*—Jonathan G Sterrett
(74) *Attorney, Agent, or Firm*—Greenblum & Bernstein P.L.C.

(57) ABSTRACT

There is provided a method of managing production quantity that includes determining a standard inventory quantity of products to be stocked in the single delivery center for a time of at least one predetermined cycle ahead based on a shipment record of the single delivery center, and determining a total assembly quantity of products to be assembled by the at least one factory for a time of at least one predetermined cycle ahead based on the determined standard inventory quantity of the single delivery center and an actual inventory quantity of the at least one factory.

18 Claims, 21 Drawing Sheets

| | | | t | | t+1 | | t+2 | | t+3 | |
|---|---|---|---|---|---|---|---|---|---|---|
| | | | S | E | S | E | S | E | S | E |
| d Delivery center | Expected shipment quantity | ES | 0 | | 150 | | 173 | | 154 | |
| | Shipment quantity | SP | 0 | | 80 | | 0 | | 0 | |
| | Actual inventory | AIS, AIE | 0 | 0 | 300 | 220 | 415 | 415 | 457 | 457 |
| | Standard inventory | SI | 300 | | 300 | | 345 | | 307 | |
| f Factories | Shipment quantity | SP | 300 | | 195 | | 42 | | 0 | |
| | Actual inventory | AIS, AIE | 0 | 150 | 150 | 150 | 150 | 173 | 173 | 173 |
| | Standard inventory | SI | 150 | | 150 | | 173 | | 154 | |
| | Expected assembly | EA | 300 | | 195 | | 135 | | 164 | |
| | Adjustment assembly | AA | 150 | | 0 | | -70 | | -183 | |
| | Total assembly quantity | TA | 450 | | 195 | | 65 | | 0 | |

FIG.18

None-fluctuating standard inventory quantity case

| | | 0 | | t | | t+1 | | t+2 | | t+3 | | t+4 | | t+5 | |
|---|---|---|---|---|---|---|---|---|---|---|---|---|---|---|---|
| | | S | E | S | E | S | E | S | E | S | E | S | E | S | E |
| d Delivery center | Expected shipment quantity ES | | 0 | | 500 | | 500 | | 500 | | 500 | | 500 | | 500 |
| | Shipment quantity SP | | 0 | | 650 | | 650 | | 650 | | 650 | | 650 | | 650 |
| | Actual inventory AIS, AIE | 0 | 0 | 1000 | 350 | 850 | 200 | 850 | 200 | 1000 | 350 | 1150 | 500 | 1150 | 500 |
| | Standard inventory quantity SI | 1000 | | 1000 | | 1000 | | 1000 | | 1000 | | 1000 | | 1000 | |
| f Factories | Shipment quantity SP | 1000 | | 500 | 500 | 650 | 500 | 800 | 500 | 800 | 500 | 650 | 500 | 500 | 500 |
| | Actual inventory AIS, AIE | 0 | 500 | 500 | 500 | 500 | 500 | 500 | 500 | 500 | 500 | 500 | 500 | 500 | 500 |
| | Standard inventory quantity SI | 500 | | 500 | | 500 | | 500 | | 500 | | 500 | | 500 | |
| | Expected assembly quantity EA | 1500 | | 650 | | 650 | | 500 | | 350 | | 200 | | 200 | |
| | Adjustment assembly quantity AA | 0 | | -150 | | 0 | | 300 | | 450 | | 450 | | 300 | |
| | Total assembly quantity TA | 1500 | | 500 | | 650 | | 800 | | 800 | | 650 | | 500 | |

FIG.19

Increasing standard inventory quantity case

| | | | 0 | | t | | t+1 | | t+2 | | t+3 | | t+4 | | t+5 | |
|---|---|---|---|---|---|---|---|---|---|---|---|---|---|---|---|---|
| | | | S | E | S | E | S | E | S | E | S | E | S | E | S | E |
| d Delivery center | Expected shipment quantity | ES | | 0 | | 550 | | 600 | | 650 | | 700 | | 750 | | 800 |
| | Shipment quantity | SP | | 0 | | 715 | | 780 | | 845 | | 910 | | 975 | | 1040 |
| | Actual inventory | AIS, AIE | 0 | 0 | 1100 | 385 | 1035 | 255 | 1070 | 225 | 1270 | 360 | 1535 | 560 | 1700 | 660 |
| | Standard inventory quantity | SI | 1100 | | 1100 | | 1200 | | 1300 | | 1400 | | 1500 | | 1600 | |
| f Factories | Shipment quantity | SP | 1100 | | 650 | | 815 | | 1045 | | 1175 | | 1140 | | 1040 | |
| | Actual inventory | AIS, AIE | 0 | 500 | 500 | 550 | 550 | 600 | 600 | 650 | 650 | 700 | 700 | 750 | 750 | 800 |
| | Standard inventory quantity | SI | 500 | | 550 | | 600 | | 650 | | 700 | | 750 | | 800 | |
| | Expected assembly quantity | EA | 1500 | | 815 | | 865 | | 800 | | 735 | | 605 | | 575 | |
| | Adjustment assembly quantity | AA | 100 | | -115 | | 0 | | 295 | | 490 | | 585 | | 515 | |
| | Total assembly quantity | TA | 1600 | | 700 | | 865 | | 1095 | | 1225 | | 1190 | | 1090 | |

FIG.20

Decreasing standard inventory quantity case

<table>
<tr><th colspan="2"></th><th></th><th colspan="2">0</th><th colspan="2">t</th><th colspan="2">t+1</th><th colspan="2">t+2</th><th colspan="2">t+3</th><th colspan="2">t+4</th><th colspan="2">t+5</th></tr>
<tr><th colspan="2"></th><th></th><th>S</th><th>E</th><th>S</th><th>E</th><th>S</th><th>E</th><th>S</th><th>E</th><th>S</th><th>E</th><th>S</th><th>E</th><th>S</th><th>E</th></tr>
<tr><td rowspan="4">d Delivery center</td><td>Expected shipment quantity</td><td>ES</td><td>0</td><td></td><td>1400</td><td></td><td>1300</td><td></td><td>1200</td><td></td><td>1100</td><td></td><td>1000</td><td></td><td>900</td><td></td></tr>
<tr><td>Shipment quantity</td><td>SP</td><td>0</td><td></td><td>1820</td><td></td><td>1690</td><td></td><td>1560</td><td></td><td>1430</td><td></td><td>1300</td><td></td><td>1170</td><td></td></tr>
<tr><td>Actual inventory</td><td>AIS, AIE</td><td>0</td><td>0</td><td>2800</td><td>980</td><td>2180</td><td>490</td><td>2110</td><td>550</td><td>2460</td><td>1030</td><td>2680</td><td>1380</td><td>2350</td><td>1180</td></tr>
<tr><td>Standard inventory quantity</td><td>SI</td><td>2800</td><td></td><td>2800</td><td></td><td>2600</td><td></td><td>2400</td><td></td><td>2200</td><td></td><td>2000</td><td></td><td>1800</td><td></td></tr>
<tr><td rowspan="6">f Factories</td><td>Shipment quantity</td><td>SP</td><td>2800</td><td></td><td>1200</td><td></td><td>1620</td><td></td><td>1910</td><td></td><td>1650</td><td></td><td>970</td><td></td><td>420</td><td></td></tr>
<tr><td>Actual inventory</td><td>AIS, AIE</td><td>0</td><td>1500</td><td>1500</td><td>1400</td><td>1400</td><td>1300</td><td>1300</td><td>1200</td><td>1200</td><td>1100</td><td>1100</td><td>1000</td><td>1000</td><td>900</td></tr>
<tr><td>Standard inventory quantity</td><td>SI</td><td>1500</td><td></td><td>1400</td><td></td><td>1300</td><td></td><td>1200</td><td></td><td>1100</td><td></td><td>1000</td><td></td><td>900</td><td></td></tr>
<tr><td>Expected assembly quantity</td><td>EA</td><td>1500</td><td></td><td>1620</td><td></td><td>1520</td><td></td><td>900</td><td></td><td>280</td><td></td><td>0</td><td></td><td>0</td><td></td></tr>
<tr><td>Adjustment assembly quantity</td><td>AA</td><td>2800</td><td></td><td>-520</td><td></td><td>0</td><td></td><td>910</td><td></td><td>1270</td><td></td><td>870</td><td></td><td>320</td><td></td></tr>
<tr><td>Total assembly quantity</td><td>TA</td><td>4300</td><td></td><td>1100</td><td></td><td>1520</td><td></td><td>1810</td><td></td><td>1550</td><td></td><td>870</td><td></td><td>320</td><td></td></tr>
</table>

| | | | 1 | | 2 | | 3 | | 4 | |
|---|---|---|---|---|---|---|---|---|---|---|
| | | | S | E | S | E | S | E | S | E |
| d Delivery center | Expected shipment quantity | ES | 0 | | 750 | | 1313 | | 1172 | |
| | Shipment quantity | SP | 0 | | 350 | | 0 | | 0 | |
| | Actual inventory | AIS, AIE | 0 | 0 | 1500 | 1150 | 1675 | 1675 | 1689 | 1689 |
| | Standard inventory | SI | 1500 | | 1500 | | 2625 | | 2344 | |
| f Factory A 2 | Shipment quantity | SP | 300 | | 525 | | 14 | | 0 | |
| | Actual inventory | AIS, AIE | 0 | 150 | 150 | 150 | 150 | 263 | 263 | 263 |
| | Standard inventory | SI | 150 | | 150 | | 263 | | 234 | |
| | Expected assembly | EA | 300 | | 615 | | 716 | | 417 | |
| | Adjustment assembly | AA | 150 | | -90 | | -589 | | -446 | |
| | Total assembly quantity | TA | 450 | | 525 | | 127 | | 0 | |
| f Factory B 8 | Shipment quantity | SP | 1200 | | 2100 | | 55 | | 0 | |
| | Actual inventory | AIS, AIE | 0 | 600 | 600 | 600 | 600 | 1050 | 1050 | 1050 |
| | Standard inventory | SI | 600 | | 600 | | 1050 | | 938 | |
| | Expected assembly | EA | 1200 | | 2460 | | 2866 | | 1667 | |
| | Adjustment assembly | AA | 600 | | -360 | | -2361 | | -1779 | |
| | Total assembly quantity | TA | 1800 | | 2100 | | 505 | | 0 | |

Site shipment record table

| Site code | Year/week | Product code | Shipment quantities |
|---|---|---|---|
| 18021 | 200202 | 1369 | 195 |
| 19000 | 200202 | 1369 | 80 |
| 18021 | 200202 | 10460 | 525 |
| 18031 | 200202 | 10460 | 2100 |
| 18031 | 200202 | 27697 | 38 |
| 19000 | 200202 | 10460 | 350 |
| 19000 | 200202 | 27697 | 10 |

408

Site master

| Site code | Site name |
|---|---|
| 19000 | Delivery center |
| 18001 | Factory C |
| 18021 | Factory A |
| 18031 | Factory B |

Propotion master

| Product code | Line # | Site code | Proportions |
|---|---|---|---|
| 1369 | 1 | 18021 | 10 |
| 10460 | 1 | 18021 | 2 |
| 10460 | 2 | 18031 | 8 |
| 27697 | 1 | 18031 | 10 |

403

Inventory table

| Site code | Product code | Year/week | Start-of-week Inventory quantities | End-of-week Inventory quantities |
|---|---|---|---|---|
| 18021 | 1369 | 200201 | 0 | 150 |
| 18021 | 1369 | 200202 | 150 | 150 |
| 18021 | 1369 | 200203 | 150 | 173 |
| 19000 | 1369 | 200201 | 0 | 0 |
| 19000 | 1369 | 200202 | 300 | 220 |
| 19000 | 1369 | 200203 | 415 | 415 |
| 18031 | 27697 | 200201 | 0 | 25 |
| 18031 | 27697 | 200202 | 25 | 25 |
| 18031 | 27697 | 200203 | 25 | 32 |
| 19000 | 27697 | 200201 | 0 | 0 |
| 19000 | 27697 | 200202 | 50 | 40 |
| 19000 | 27697 | 200203 | 78 | 78 |
| 18021 | 10460 | 200201 | 0 | 150 |
| 18021 | 10460 | 200202 | 150 | 150 |
| 18021 | 10460 | 200203 | 150 | 263 |
| 18031 | 10460 | 200201 | 0 | 600 |
| 18031 | 10460 | 200202 | 600 | 600 |
| 18031 | 10460 | 200203 | 600 | 1050 |
| 19000 | 10460 | 200201 | 0 | 0 |
| 19000 | 10460 | 200202 | 1500 | 1500 |
| 19000 | 10460 | 200203 | 1675 | 1675 |

Product master 404

| Product code | Categorization code | Product name |
|---|---|---|
| 1369 | 100 | SLR – B |
| 10460 | 300 | Compact zoom A |
| 27697 | 500 | Zoom lens 28 – 90mm |

Categorization master 405

| Categorization codes | Categorization names | Initial standard Inventory quantities | Factors $\Omega$ |
|---|---|---|---|
| 100 | Single-lens reflex camera | 300 | 0.3 |
| 200 | Compact camera | 1000 | 1 |
| 300 | Compact zoom camera | 1500 | 1.5 |
| 400 | Digital camera | 2000 | 2 |
| 500 | Lens | 50 | 0.5 |

FIG.26

Analysis table

| Site code | Product code | Year/week | Standard inventory quantities | Shipment quantities 401 | Expected shipment quantities | Expected assembly quantities 501 | Adjustment assembly quantities 502 |
|---|---|---|---|---|---|---|---|
| 18021 | 1369 | 200201 | 150 | 300 | 0 | 300 | 150 |
| 19000 | 1369 | 200201 | 300 | 0 | 0 | 0 | 0 |
| 18021 | 1369 | 200202 | 150 | 195 | 0 | 195 | 0 |
| 19000 | 1369 | 200202 | 300 | 0 | 150 | 0 | 0 |
| 18021 | 1369 | 200203 | 173 | 0 | 173 | 0 | -70 |
| 19000 | 1369 | 200203 | 345 | 0 | 0 | 135 | 0 |
| 18021 | 1369 | 200204 | 154 | 0 | 154 | 0 | 0 |
| 19000 | 1369 | 200204 | 307 | 0 | 0 | 0 | 0 |
| 18031 | 27697 | 200201 | 25 | 50 | 0 | 50 | 25 |
| 19000 | 27697 | 200201 | 50 | 0 | 0 | 0 | 0 |
| 18031 | 27697 | 200202 | 25 | 38 | 0 | 38 | 0 |
| 19000 | 27697 | 200202 | 50 | 10 | 25 | 0 | 0 |
| 18031 | 27697 | 200203 | 32 | 0 | 0 | 23 | -15 |
| 19000 | 27697 | 200203 | 63 | 0 | 32 | 0 | 0 |
| 18031 | 27697 | 200204 | 27 | 0 | 27 | 0 | 0 |
| 19000 | 27697 | 200204 | 54 | 0 | 0 | 0 | 0 |
| 18021 | 10460 | 200201 | 150 | 300 | 0 | 300 | 150 |
| 18031 | 10460 | 200201 | 600 | 1200 | 0 | 1200 | 600 |
| 19000 | 10460 | 200201 | 1500 | 0 | 0 | 0 | 0 |
| 18021 | 10460 | 200202 | 150 | 525 | 0 | 615 | -90 |
| 18031 | 10460 | 200202 | 600 | 2100 | 0 | 2460 | -360 |
| 19000 | 10460 | 200202 | 1500 | 350 | 750 | 0 | 0 |
| 18021 | 10460 | 200203 | 263 | 0 | 0 | 716 | -589 |
| 18031 | 10460 | 200203 | 1050 | 0 | 0 | 2866 | -2361 |
| 19000 | 10460 | 200203 | 2625 | 0 | 1313 | 0 | 0 |
| 18021 | 10460 | 200204 | 234 | 0 | 0 | 0 | 0 |
| 18031 | 10460 | 200204 | 938 | 0 | 0 | 0 | 0 |
| 19000 | 10460 | 200204 | 2344 | 0 | 1172 | 0 | 0 |

# METHOD AND SYSTEM OF MANAGING PRODUCTION QUANTITY

BACKGROUND OF THE INVENTION

The present invention relates to a method of managing production quantity. More specifically, the present invention relates to a method of determining production quantity of a factory in a distribution system where products shipped from factories are stocked in a delivery center and then supplied to customers.

In general, products produced by a maker are supplied to the customers through distributors. Since a plurality of factories, dealers and customers are involved in the distribution of products, a flow of products in the distribution becomes very complicated.

FIG. 27 schematically shows an example of the flow of products in a typical distribution system. In FIG. 27, three factories A, B and C, two dealers A and B, and two customers A and B are indicated. In the example of FIG. 27, flows of products from the factories A and B to the customers A and B through the dealer A are indicated by arrows.

In regard to the customers A and B, the products are supplied from the factories A and B through a single dealer A. The dealer A has inventories to answer orders from the customers.

In a distribution system where factories and customers are related via a single delivery center (for example, the dealer A for the customers A and B in FIG. 27), a method or a system of managing production quantity which enables to reduce an inventory quantity of the single delivery center and to shorten a lead time is required.

SUMMARY OF THE INVENTION

The present invention is advantageous in that it provides a method or a system of managing production quantity which enables to reduce inventories and to shorten a lead time in a distribution system where customers and factories are related via a single delivery center.

According to an aspect of the invention, there is provided a method of managing production quantity in a distribution system where products shipped from at least one factory are stocked in a single delivery center at every predetermined cycle and then supplied to customers from the single delivery center. The method includes: determining a standard inventory quantity of products to be stocked in the single delivery center for a time of at least one predetermined cycle ahead based on a shipment record of the single delivery center; and determining a total assembly quantity of products to be assembled by the at least one factory for a time of at least one predetermined cycle ahead based on the determined standard inventory quantity of the single delivery center and an actual inventory of the at least one factory.

With this configuration, the inventory can be gathered at the single delivery center, and the number of the inventory in the single delivery center can be kept at a minimum level. Further, since the total assembly quantity can be obtained in advance, production and packaging schedules for the future cycles can be prepared.

Optionally, the at least one factory may include a plurality of factories that produces the same product, and, with regard to the same product, the total assembly quantity may be determined for each of the plurality of factories according to a predetermined production proportion.

In a particular case, the determining a standard inventory quantity may include: determining an approximation curve of variations of a shipment quantity of the single delivery center based on the shipment record of the single delivery center; and determining the standard inventory quantity of the single delivery center for the time one or more predetermined cycles ahead based on the determined approximation curve.

In a particular case, the determining a standard inventory quantity may include: determining a first approximation curve of variations of a shipment quantity of the single delivery center based on the shipment record of the single delivery center; determining a gradient of the shipment quantity of the single delivery center for a current cycle t based on the determined approximation curve; and determining a (t+1)-th cycle standard inventory quantity of the single delivery center based on the determined gradient.

Optionally, the (t+1)-th cycle standard inventory quantity of the single delivery center dSI(t+1) may be determined for each product according to:

$$dSI(t+1) = dSI(t) + a \times \Omega$$

where "dSI(t)" represents a standard inventory quantity for a current cycle t, "a" represents the determined gradient, and $\Omega$ represents a factor which is predetermined according to a product type.

Still optionally, the method may include determining an (t+1)-th cycle expected shipment quantity of the single delivery center based on the determined (t+1)-th cycle standard inventory quantity of the single delivery center.

Still optionally, the method may include determining a (t+1)-th cycle standard inventory quantity of the at least one factory based on the determined (t+1)-th cycle standard inventory quantity of the single delivery center.

Still optionally, each of the (t+1)-th cycle expected shipment quantity of the single delivery center and the (t+1)-th cycle standard inventory quantity of the at least one factory may be determined by multiplying the (t+1)-th cycle standard inventory quantity of the single delivery center by a factor.

In a particular case, the factor may be ½.

Optionally, the determining a standard inventory quantity may include: determining a second approximation curve of variations of a shipment quantity of the single delivery center based on the shipment record of the single delivery center and the (t+1)-th cycle expected shipment quantity of the single delivery center; determining a gradient of the shipment quantity of the single delivery center for the (t+1)-th cycle based on the determined second approximation curve; determining a (t+2)-th cycle standard inventory quantity of the single delivery center based on the determined gradient for the (t+1)-th cycle; and determining a (t+2)-th cycle expected shipment quantity of the single delivery center and a (t+2)-th cycle standard inventory quantity of the at least one factory based on the determined (t+2)-th cycle standard inventory quantity of the single delivery center.

Still optionally, the (t+2)-th cycle standard inventory quantity of the single delivery center dSI(t+2) may be determined for each product according to:

$$dSI(t+2) = dSI(t+1) + b \times \Omega$$

where "dSI(t+1)" represents the (t+1)-th cycle standard inventory quantity of the single delivery center, "b" represents the determined gradient for the (t+1) cycle, and $\Omega$ represents a factor which is predetermined according to a product type.

Still optionally, the method may include determining a (t+1)-th cycle shipment quantity of the at least one factory based on the (t+2)-th cycle standard inventory quantity of the single delivery center, the (t+1)-th cycle standard inventory quantity of the single delivery center, an actual inventory quantity of the single delivery center for an end of the current cycle t, and a standard inventory quantity of the single delivery center for the current cycle t.

Still optionally, the determining a standard inventory quantity may include: determining a third approximation curve of variations of the shipment quantity of the single delivery center based on the (t+1)-th cycle and (t+2)-th cycle expected shipment quantities of the single delivery center; determining a gradient of the shipment quantity of the single delivery center for the (t+2)-th cycle based on the determined third approximation curve; determining a (t+3)-th cycle standard inventory quantity of the single delivery center based on the determined gradient for the (t+2)-th cycle; and determining a (t+3)-th cycle expected shipment quantity of the single delivery center and a (t+3)-th cycle standard inventory quantity of the at least one factory based on the determined (t+3)-th cycle standard inventory quantity of the single delivery center.

In a particular case, the (t+3)-th cycle standard inventory quantity of the single delivery center dSI(t+3) may be determined for each product according to:

$$dSI(t+3)=dSI(t+2)+c\times\Omega$$

where "c" represents the determined gradient for the (t+2) cycle.

Optionally, the method may include determining a (t+2)-th cycle expected assembly quantity of the at least one factory based on the (t+3)-th cycle standard inventory quantity of the single delivery center, the (t+1)-th cycle expected shipment quantity of the single delivery center, the (t+2)-th cycle expected shipment quantity of the single delivery center, the actual inventory quantity of the single delivery center for the end of the current cycle t, the determined (t+1)-th cycle shipment quantity of the at least one factory, and a shipment quantity of the at least one factory for the current cycle t.

Still optionally, the method may include determining a (t+1)-th cycle total assembly quantity of the at least one factory by adding a (t+1)-th cycle adjustment assembly quantity determined based on the actual inventory quantity of the at least one factory to a (t+1)-th cycle expected assembly quantity of the at least one factory which has been determined at a (t−1)-th cycle.

Still optionally, the method may include: determining an actual inventory quantity of the at least one factory for a start of the (t+1) cycle based on an actual inventory quantity of the at least one factory for an end of the current cycle t; determining a (t+1)-th cycle adjustment assembly quantity based on the (t+1)-th cycle standard inventory quantity of the at least one factory, a (t+1)-th cycle expected assembly quantity of the at least one factory which has been determined at the (t−1)-th cycle, the determined actual inventory quantity of the at least one factory for the start of the (t+1) cycle, and the (t+1)-th cycle shipment quantity of the at least one factory; and determining a (t+1)-th cycle total assembly quantity of the at least one factory by adding the (t+1)-th cycle adjustment assembly quantity to the (t+1)-th cycle expected assembly quantity of the at least one factory.

In a particular case, the predetermined cycle may be a week.

According to another aspect of the invention, there is provided a computer program product to be executed by a computer to achieve a method of managing production quantity in a distribution system where products shipped from at least one factory are stocked in a single delivery center at every predetermined cycle and then supplied to customers from the single delivery center. The method includes: determining a standard inventory quantity of products to be stocked in the single delivery center for a time of at least one predetermined cycle ahead based on a shipment record of the single delivery center; and determining an assembly quantity of products to be assembled by the at least one factory for a time of at least one predetermined cycle ahead based on the determined standard inventory quantity and an actual inventory quantity of the at least one factory.

According to another aspect of the invention, there is provided a production quantity management system for managing production quantity in a distribution system where products shipped from at least one factory are stocked in a single delivery center at every predetermined cycle and then supplied to customers from the single delivery center. The system is provided with a plurality of storing systems that are respectively located in the single delivery center and the at least one factory to store information concerning an inventory and a shipment of the single delivery center and the at least one factory, respectively; and a managing center. The managing center includes a calculating system that determines a standard inventory quantity of products to be stocked in the single delivery center for a time of at least one predetermined cycle ahead based on a shipment record of the single delivery center and the information obtained from the plurality storing system, and a management system that determines a total assembly quantity of products to be assembled by the at least one factory for a time of at least one predetermined cycle ahead based on the determined standard inventory quantity of the single delivery center and an actual inventory quantity of the at least one factory, and that sends the determined total assembly quantity to the at least one factory.

With this configuration, the inventory can be gathered at the single delivery center, and the number of the inventory in the single delivery center can be kept at a minimum level. Further, since the total assembly quantity can be obtained in advance, production and packaging schedules for the future cycles can be prepared.

In a particular case, the at least one factory may include a plurality of factories. In this case, with regard to a certain product, the management system may determine the total assembly quantity for each of the plurality of factories according a number of the plurality of factories and a predetermined production proportion, and may send determined total assembly quantities to the respective factories.

Optionally, the calculating system may determine an approximation curve of variations of a shipment quantity of the single delivery center based on the shipment record of the single delivery center, and determines the standard inventory quantity of the single delivery center for the time one or more predetermined cycles ahead based on the determined approximation curve.

In a particular case, the calculating system may determine a first approximation curve of variations of a shipment quantity of the single delivery center based on the shipment record of the single delivery center, determine a gradient of the shipment quantity of the single delivery center for a current cycle t based on the determined approximation curve, and determine a (t+1)-th cycle standard inventory quantity of the single delivery center based on the determined gradient.

Optionally, the calculating system may determine the (t+1)-th cycle standard inventory quantity of the single delivery center dSI(t+1) for each product according to:

$$dSI(t+1)=dSI(t)+a\times\Omega$$

where "dSI(t)" represents a standard inventory quantity for a current cycle t, "a" represents the determined gradient, and $\Omega$ represents a factor which is predetermined according to a product type.

Still optionally, the calculating system may determine an (t+1)-th cycle expected shipment quantity of the single delivery center based on the determined (t+1)-th cycle standard inventory quantity of the single delivery center.

Still optionally, the calculating system may determine a (t+1)-th cycle standard inventory quantity of the at least one factory based on the determined (t+1)-th cycle standard inventory quantity of the single delivery center.

In a particular case, the calculating system may determine each of the (t+1)-th cycle expected shipment quantity of the single delivery center and the (t+1)-th cycle standard inventory quantity of the at least one factory by multiplying the (t+1)-th cycle standard inventory quantity of the single delivery center by a factor.

In a particular case, the factor may be ½.

Optionally, the calculating system may determine: a second approximation curve of variations of a shipment quantity of the single delivery center based on the shipment record of the single delivery center and the (t+1)-th cycle expected shipment quantity of the single delivery center; a gradient of the shipment quantity of the single delivery center for the (t+1)-th cycle based on the determined second approximation curve; a (t+2)-th cycle standard inventory quantity of the single delivery center based on the determined gradient for the (t+1)-th cycle; and a (t+2)-th cycle expected shipment quantity of the single delivery center and a (t+2)-th cycle standard inventory quantity of the at least one factory based on the determined (t+2)-th cycle standard inventory quantity of the single delivery center.

In a particular case, the calculating system may determine the (t+2)-th cycle standard inventory quantity of the single delivery center dSI(t+2) for each product according to:

$$dSI(t+2) = dSI(t+1) + b \times \Omega$$

where "dSI(t+1)" represents the (t+1)-th cycle standard inventory quantity of the single delivery center, "b" represents the determined gradient for the (t+1) cycle, and $\Omega$ represents a factor which is predetermined according to a product type.

Optionally, the calculating system may determine a (t+1)-th cycle shipment quantity of the at least one factory based on the (t+2)-th cycle standard inventory quantity of the single delivery center, the (t+1)-th cycle standard inventory quantity of the single delivery center, an actual inventory quantity of the single delivery center for an end of the current cycle t, and a standard inventory quantity of the single delivery center for the current cycle t.

Still optionally, the calculating system may determine: a third approximation curve of variations of the shipment quantity of the single delivery center based on the (t+1)-th cycle and (t+2)-th cycle expected shipment quantities of the single delivery center; a gradient of the shipment quantity of the single delivery center for the (t+2)-th cycle based on the determined third approximation curve; a (t+3)-th cycle standard inventory quantity of the single delivery center based on the determined gradient for the (t+2)-th cycle; and a (t+3)-th cycle expected shipment quantity of the single delivery center and a (t+3)-th cycle standard inventory quantity of the at least one factory based on the determined (t+3)-th cycle standard inventory quantity of the single delivery center.

In a particular case, the calculating system may determine the (t+3)-th cycle standard inventory quantity of the single delivery center dSI(t+3) for each product according to:

$$dSI(t+3) = dSI(t+2) + c \times \Omega$$

where "c" represents the determined gradient for the (t+2) cycle.

Optionally, the calculating system may determine a (t+2)-th cycle expected assembly quantity of the at least one factory based on the (t+3)-th cycle standard inventory quantity of the single delivery center, the (t+1)-th cycle expected shipment quantity of the single delivery center, the (t+2)-th cycle expected shipment quantity of the single delivery center, the actual inventory quantity of the single delivery center for the end of the current cycle t, the determined (t+1)-th cycle shipment quantity of the at least one factory, and a shipment quantity of the at least one factory for the current cycle t.

Still optionally, the calculating system may determine: an actual inventory quantity of the at least one factory for a start of the (t+1) cycle based on an actual inventory quantity of the at least one factory for an end of the current cycle t; a (t+1)-th cycle adjustment assembly quantity based on the (t+1)-th cycle standard inventory quantity of the at least one factory, a (t+1)-th cycle expected assembly quantity of the at least one factory which has been determined at the (t−1)-th cycle, the determined actual inventory quantity of the at least one factory for the start of the (t+1) cycle, and the (t+1)-th cycle shipment quantity of the at least one factory; and a (t+1)-th cycle total assembly quantity of the at least one factory by adding the (t+1)-th cycle adjustment assembly quantity to the (t+1)-th cycle expected assembly quantity of the at least one factory.

In a particular case, the predetermined cycle may be a week.

In a particular case, the management center may be located in the single delivery center and may be connected to the plurality of storing systems located in the at least one factory through a network.

In a particular case, the management center may be located in a site which is different from the at least one factory and the single delivery center, and may be connected to the plurality of storing systems located in the at least one factory and the single delivery center through a network.

BRIEF DESCRIPTION OF THE ACCOMPANYING DRAWINGS

FIG. 1 schematically shows flows of information and products in a distribution system according to an embodiment of the invention;

FIG. 18 is an example of a result of the simulation in which a standard inventory quantity does not change;

FIG. 19 is an example of the result of the simulation in which the standard inventory quantity monotonously increases;

FIG. 20 is an example of the result of the simulation in which the standard inventory quantity monotonously decreases;

Figure 21:
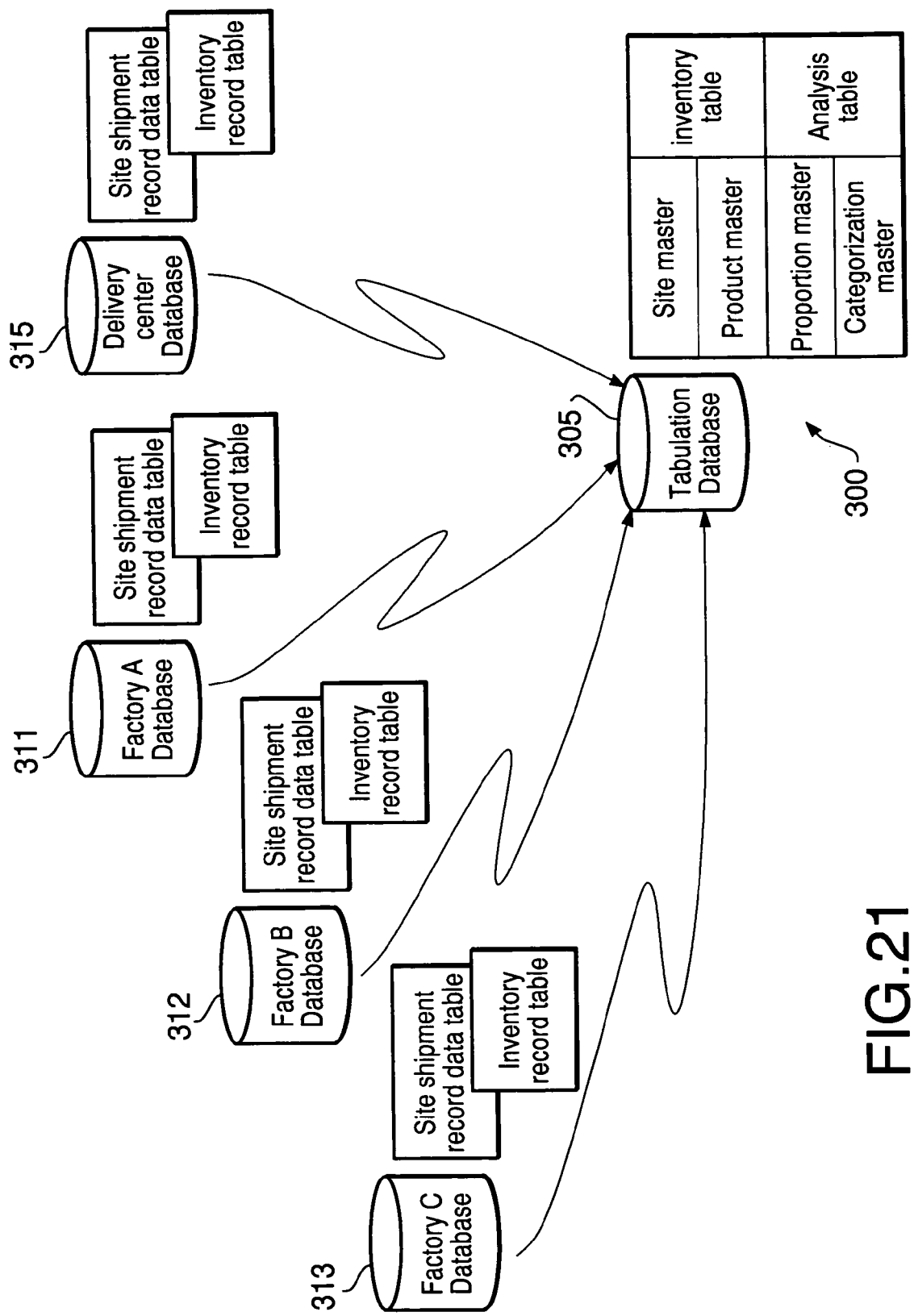
Figure 22:
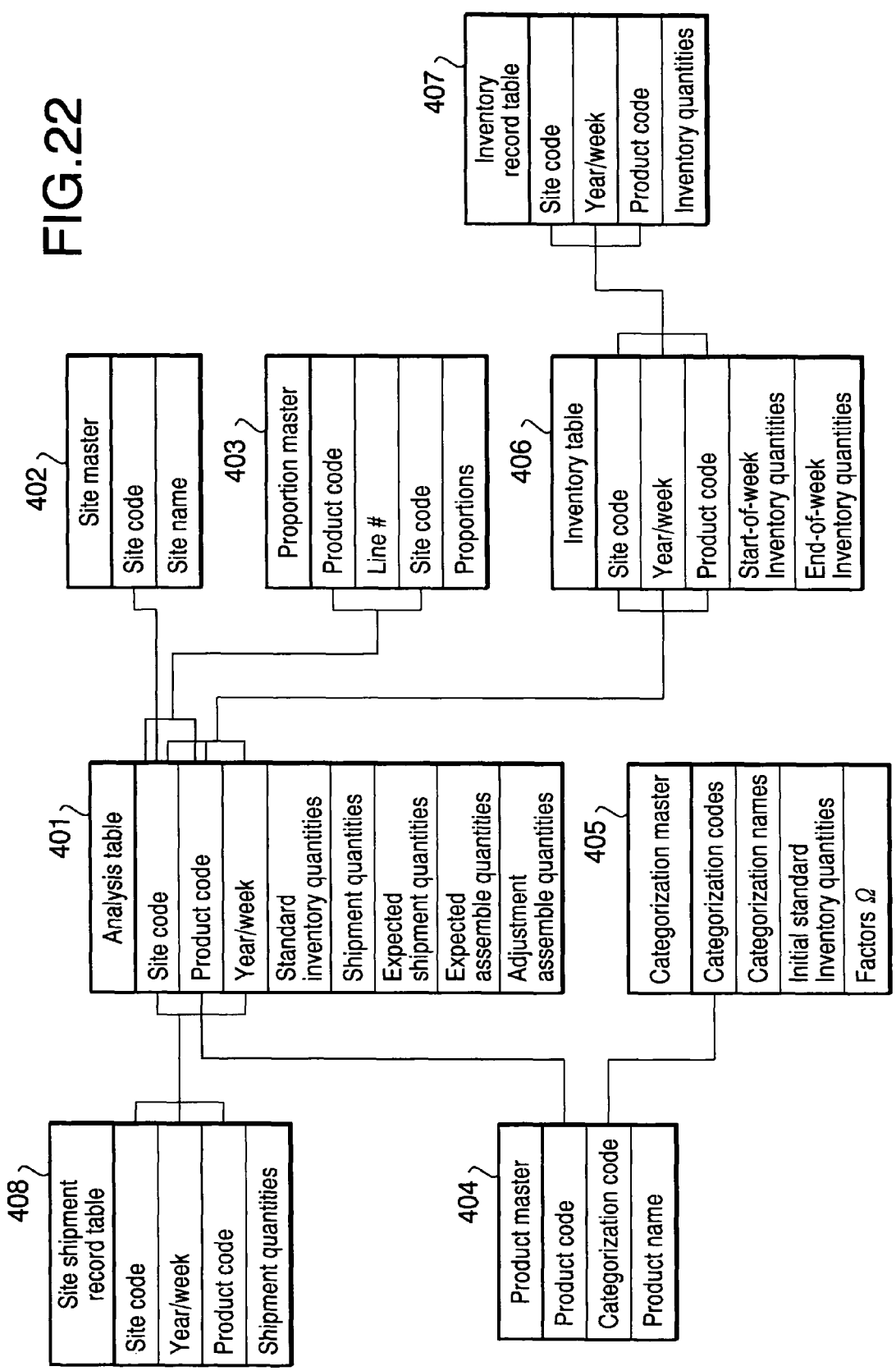
Figure 27:
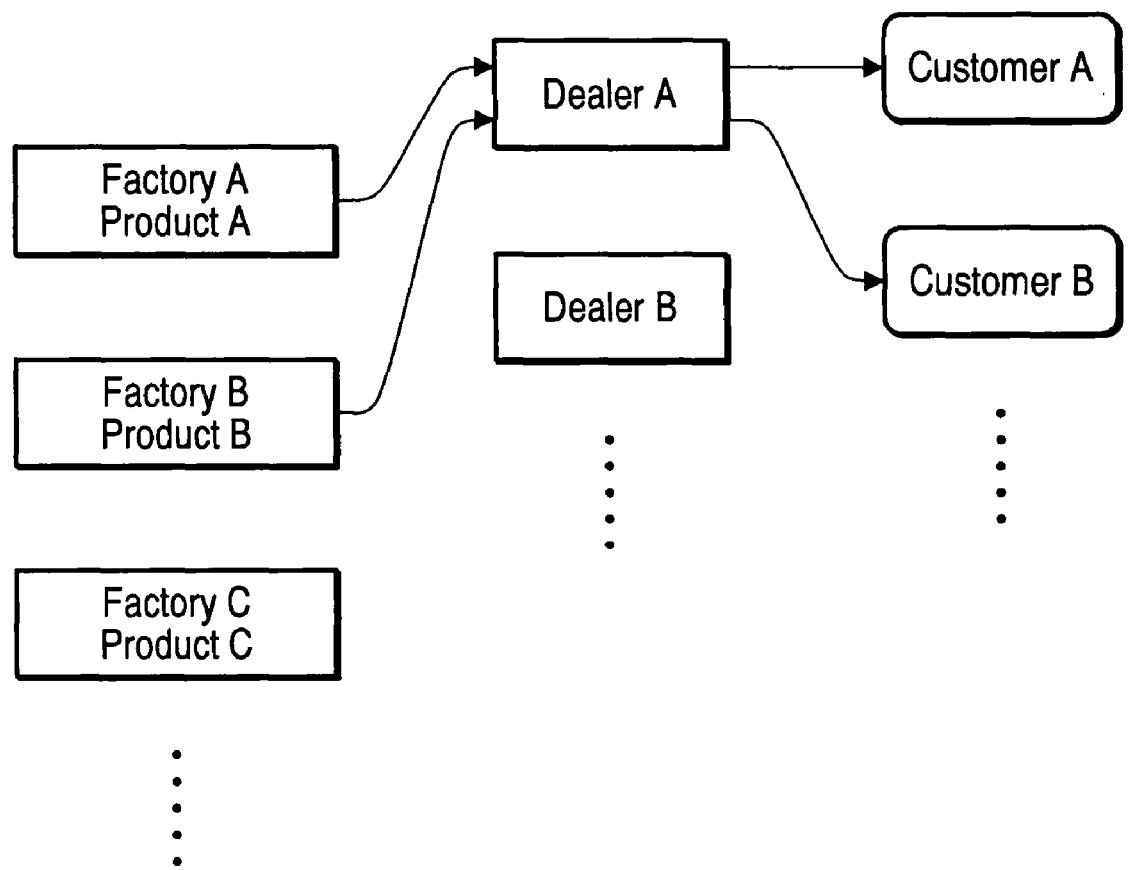

FIG. 21 schematically shows a configuration of a system for managing production quantity according to the embodiment of the invention;

FIG. 22 shows a database of a management site;

FIG. 23 shows an example of simulation results relating to a certain product;

FIG. 24 shows examples of contents of tables and masters in the database of the management site;

FIG. 25 shows examples of contents of the masters in the database of the management site;

FIG. 26 shows examples of contents of a table in the database of the management site; and FIG. 27 schematically shows an example of a flow of products in a typical distribution system.

DETAILED DESCRIPTION OF THE EMBODIMENTS

Hereinafter, an embodiment according to the present invention is described with reference to the accompanying drawings. In the drawings, the same reference numbers are used for equivalent components.

Figures 1, 2:
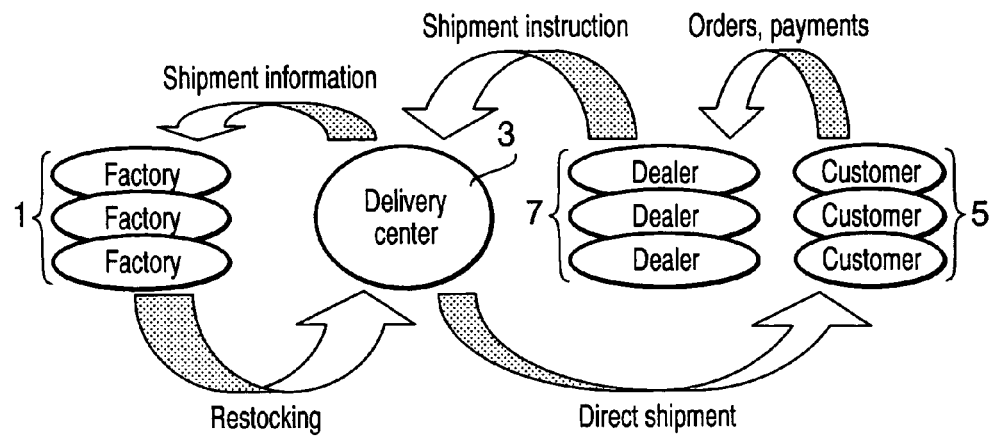
FIG. 2 shows an example of numerical data as a result of a simulation executed in a delivery center.

FIG. 1 schematically shows flows of information and products in a distribution system according to an embodiment of the invention. In this distribution system, products are produced by a plurality of factories 1, all of the products are gathered at a delivery center 3, and thereafter the products are provided to a plurality of customers 5. It should be noted that the products do not pass through dealers 7. That is, inventory management of the products is not carried out at each dealer 7 but is centralized at the delivery center 3.

Orders from the customers 5 are received by dealers 7, the dealers 7 provide shipment instructions to the delivery center 3, and thereafter the delivery center 3 provides shipment information to the factories 1.

In the distribution system shown in FIG. 1, the products are supplied to the customers 5 via a single delivery center 3. In order words, in the distribution system shown in FIG. 1, factories 1, delivery center 3, and customers 5 are in a relationship, $N_1:1:N_2$ ($N_1$ and $N_2$ are natural numbers)

As described later, in a management site 300 (see FIG. 21) located in the delivery center 3, a simulation including various calculations for keeping a standard inventory quantity at an appropriate number is performed. The shipment information based on the calculation for the standard inventory quantity is transmitted to the factories 1 from the delivery center 3. The management site 300 has, for example, a work station, which executes the simulation.

More specifically, the standard inventory quantity, an expected shipment quantity, an expected assembly quantity, an adjustment assembly quantity, and a total assembly quantity are determined by the simulation in the management site 300. These terms as used herein have meanings indicated below.

"Standard inventory quantity": A minimum necessary inventory quantity that must be maintained to support the shipment for a certain week.

"Expected shipment quantity": An expected quantity derived from the standard inventory quantity. Form example, the expected shipment quantity may be ½ of the standard inventory quantity of the delivery center 3.

"Expected assembly quantity": A necessary quantity of products to be assembled in a factory by a week at which the assembled products are restocked in the delivery center 3.

"Adjustment assembly quantity": An adjustment quantity to satisfy a standard inventory quantity of a factory.

"Total assembly quantity": The sum of the expected assembly quantity and the adjustment assembly quantity.

FIG. 2 shows an example of numerical data as a result of the simulation executed in the delivery center 3. The simulation is performed in a certain cycle of time. In this embodiment, the simulation is performed in a cycle of a week. Therefore, products assembled by the factory 1 at a certain week (t week) are restocked in the delivery center 3 at a next week (t+1 week).

Abbreviations used in FIG. 2 are indicated in detail below.
ES: Expected shipment quantity
SP: Shipment quantity
AI: Actual inventory quantity
SI: Standard inventory quantity
EA: Expected assembly quantity
AA: Adjustment assembly quantity
TA: Total assembly quantity In FIG. 2, a symbol "t" represents time in units of weeks. Hereafter, when a symbol "d" (delivery center) is used at the beginning of each abbreviation, the abbreviation is one concerning the delivery center 3, and when a symbol "f" (factory) is used at the beginning of each abbreviation, the abbreviation is one concerning the factory. As shown in FIG. 2, the actual inventory quantity (AI) is classified into a value of the start of a week by using a symbol S (Start) and a value of the end of the week by using a symbol E (End).

Figure 3:
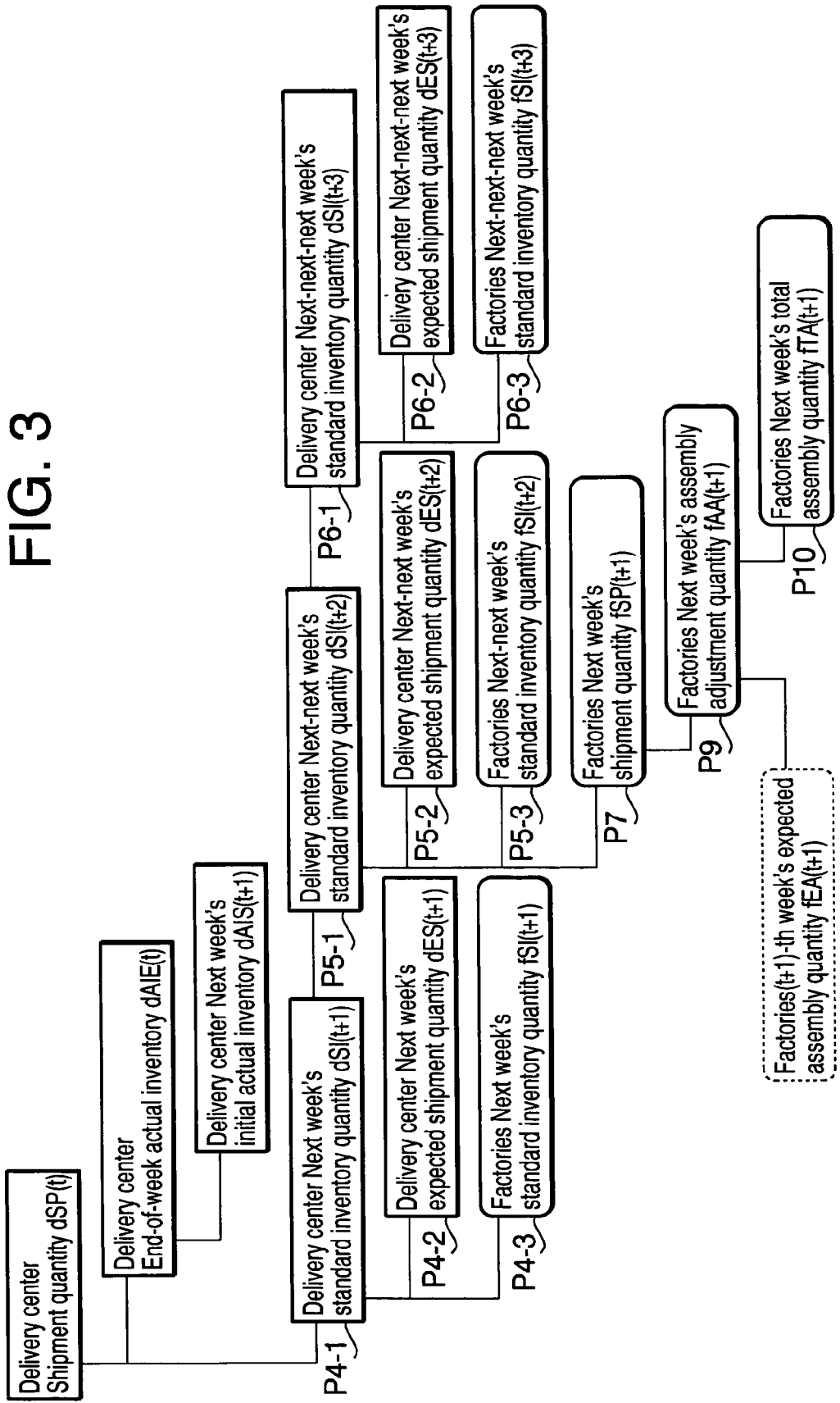
FIG. 3 shows a relationship among a plurality pieces of numerical data which are calculated in respective processes of the simulation.
Figure 4:
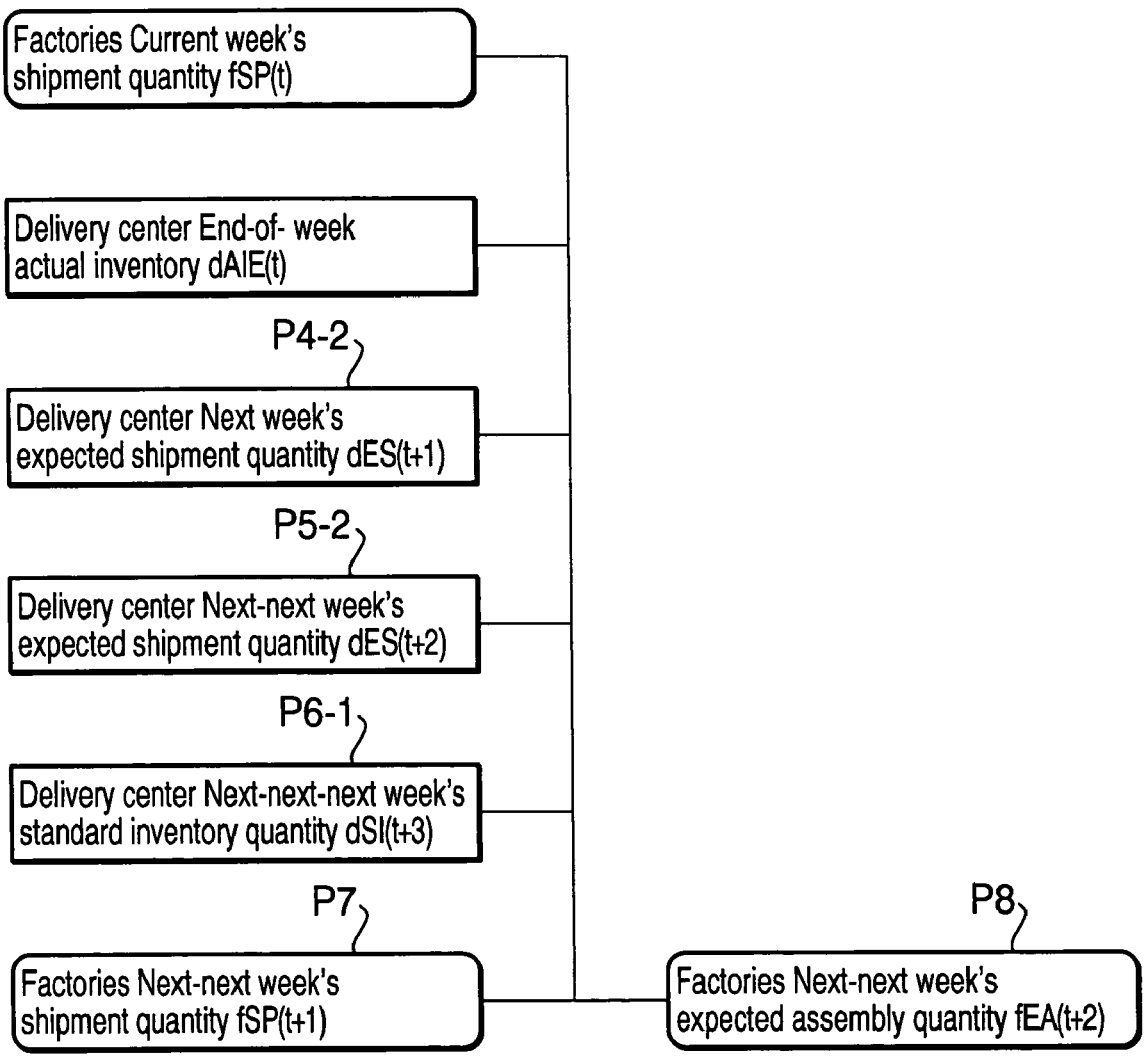
FIG. 4 shows a relationship among a plurality pieces of numerical data which are calculated in respective processes of the simulation.

FIGS. 3 and 4 show a relationship among a plurality pieces of numerical data which are calculated in respective processes of the simulation. From the overall standard point, when the current week is defined as the t-th week, the numerical values of the respective items are determined as follows at the end of the t-th week by the simulation which is carried out by the management site 300.

(1) Based on a shipment record (shipment quantities) dSP of the delivery center 3 for the past three weeks, the standard inventory quantities dSI at time points of up to three weeks ahead (corresponding to reference numbers P4-1, P5-1, and P6-1 in FIG. 3) are determined by the simulation. Also based on these results, the expected shipment quantities dES of the delivery center 3 up to three weeks ahead and the standard inventory quantities fSI of the factories up to three weeks ahead (corresponding to reference numbers P4-2, P5-2, P6-2 and P4-3, P5-3, P6-3 in FIG. 3) are determined.

(2) Next, based on the result of the above simulation (1), a next-week shipment quantity fSP(t+1) and a next-next-week (i.e., the week after next) expected assembly quantity fEA(t+2) of the factory are determined (corresponding to reference numbers P7 of FIG. 3 and p8 of FIG. 4).

(3) Next, in order to carry out feedback based on actual results in regard to the next-week expected assembly quantity fEA(t+1) that has already determined in the above simulation (2) at the (t−1)-th week, a next-week adjustment assembly quantity fAA(t+1) (corresponding to a reference number 9 in FIG. 3) is determined and a next-week total assembly quantity fTA(t+1) (corresponding to a reference number P10 in FIG. 3), which is the feedback result, is determined.

The simulation performed by the management site 300 includes the following process which are executed, for example, as subroutines.

A process of calculation of the shipment quantity of the delivery center 3

A process of calculation of the actual inventory quantity (for the end of the week) of the delivery center 3

A process of calculation of the actual inventory quantity (for the start of the week) of the delivery center 3

A process of calculation of the standard inventory quantity and the expected shipment quantity of the delivery center 3 and the standard inventory quantity of the factory for the next week A process of calculation of the standard inventory quantity and the expected shipment quantity of the delivery center 3 and the standard inventory quantity of the factory for the next-next week A process of calculation of the standard inventory quantity and the expected shipment quantity of the delivery center 3 and the standard inventory quantity of the factory for the next-next-next week (i.e., a time point three weeks ahead)

A process of calculation of the shipment quantity of the factory for the next week A process of calculation of the expected assembly quantity of the factory for the next-next week A process of calculation of the adjustment assembly quantity of the factory for the next week A process of calculation of the total assembly quantity of the factory for the next week A process of calculation of the actual inventory quantity (for the end of the week) of the factory A process of calculation of the actual inventory quantity (for the start of the week) of the factory Details of these process indicated above will now be described in order with reference to flowcharts shown in FIGS. 5-16.

<Process of Calculation of the Shipment Quantity of the Delivery Center>

Figure 5:
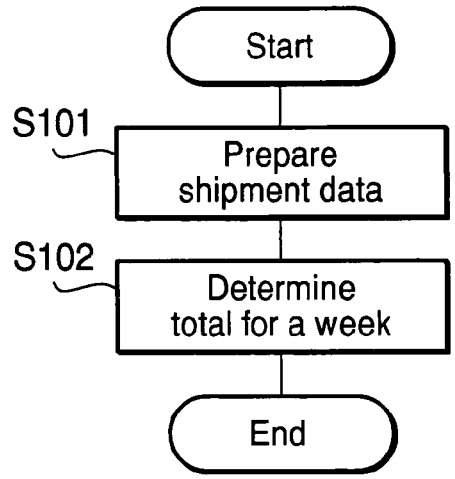
FIG. 5 is a flowchart showing a process of calculation of the shipment quantity of the delivery center.

FIG. 5 is a flowchart showing this process. In this process, at the end of the current week (t-th week), shipment data, which has been recorded at the delivery center 3, for example, on a daily basis, are totaled to determine the shipment quantity dSP(t) (steps S101 and S102).

<Process of Calculation of the Actual Inventory Quantity (for the End of the Week) of the Delivery Center>

Figure 6:
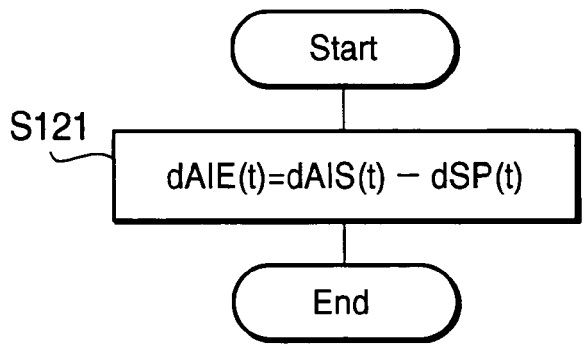
FIG. 6 is a flowchart showing a process of calculation of the actual inventory quantity of the delivery center for the end of the week.

FIG. 6 is a flowchart showing this process. As shown in FIG. 6, the actual inventory quantity of the delivery center 3 of the t-th week dAIE(t) is determined by subtracting the shipment quantity of the delivery center 3 for the current week from the inventory quantity of the delivery center 3 at the start of the current week (step S121).

$$dAIE(t)=dAIS(t)-dSP(t)$$

<Process of Calculation of the Actual Inventory Quantity (for the Start of the Next Week) of the Delivery Center>

Figure 7:
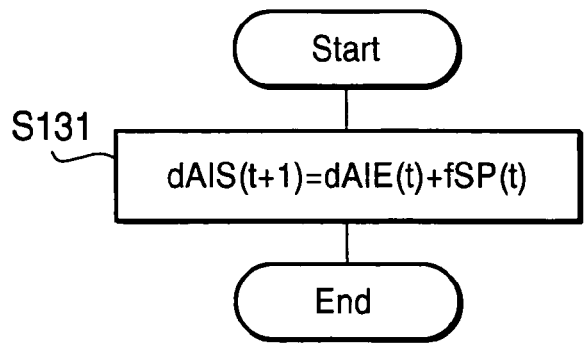
FIG. 7 is a flowchart showing a process of calculation of the actual inventory quantity of the delivery center for the start of the next week.

FIG. 7 is a flowchart showing this process. As shown in FIG. 7, the actual inventory quantity of the delivery center 3 for the start of the next week dAIS(t+1) is the sum of the inventory quantity of the delivery center 3 at the end of the current week and the shipment quantity of the factory for the current week (step S131).

$$dAIS(t+1)=dAIE(t)+fSP(t)$$

<Process of Calculation of the Standard Inventory Quantity and the Expected Shipment Quantity of the Delivery Center and the Standard Inventory Quantity of the Factories for the Next Week>

Figure 8:
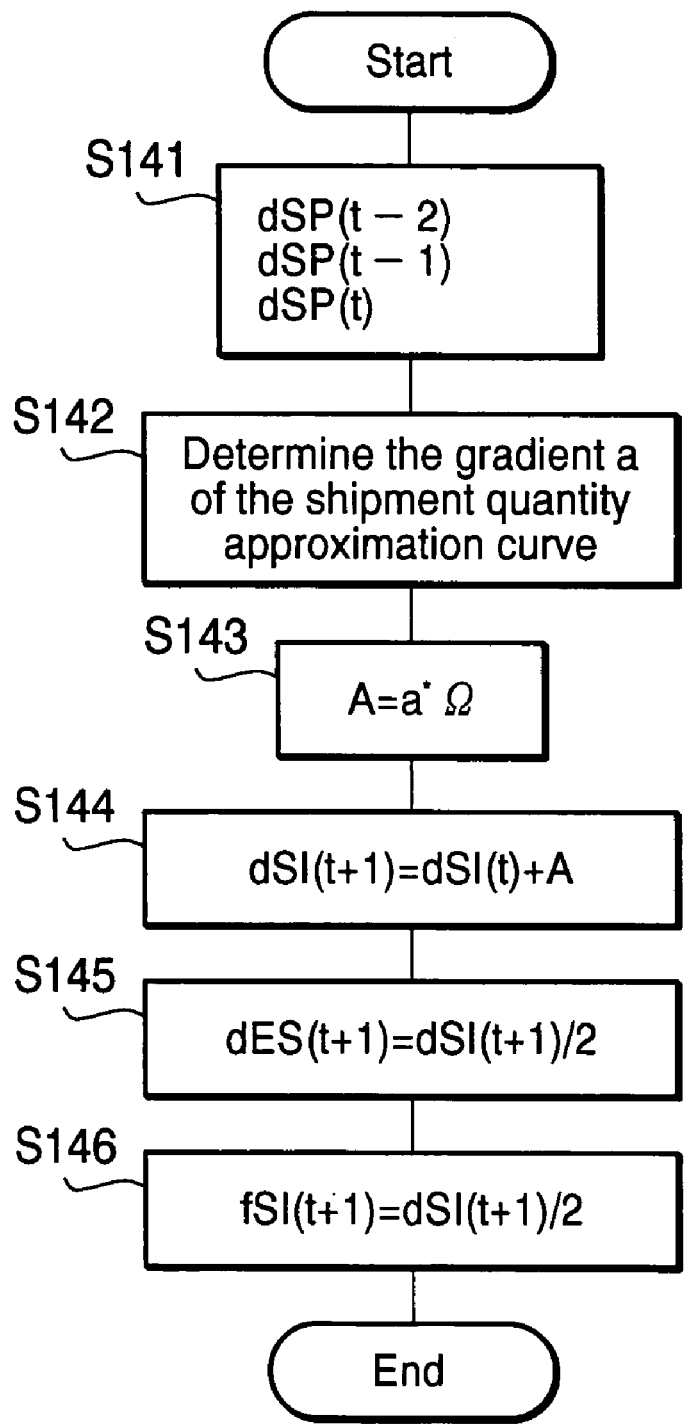
FIG. 8 is a flowchart showing a process of calculation of the standard inventory quantity and the expected shipment quantity of the delivery center and the standard inventory quantity of the factories for the next week.

FIG. 8 is a flowchart showing this process. Initially, using the shipment records, dSP(t−2), dSP(t−1), and dSP(t), of the delivery center 3 for the current week and the past two weeks (step S141), the gradient "a" at the t-th week of a shipment quantity approximation curve is determined by an approximate calculation (which will be described in detail later) (step S142). The gradient "a" is then multiplied by a factor $\Omega$, which is determined according to a type of each product, to determine the change amount A of the standard inventory quantity (step S143). The standard inventory quantity for the next week is then determined as the sum of the current week's standard inventory quantity and the change amount A (step S144).

$$dSI(t+1)=dSI(t)+A$$

The expected shipment quantity of the delivery center 3 for the next week is then determined as ½ of the standard inventory quantity of the delivery center 3 for the next week (step S145).

$$dES(t+1)=dSI(t+1)/2$$

Also, the standard inventory quantity of the factory for the next week is then determined as ½ of the standard inventory quantity of the delivery center 3 for the next week (step S146).

$$fSI(t+1)=dSI(t+1)/2$$

In this embodiment, the factor ½ is used to determine the expected shipment quantity of the delivery center 3 for the next week and the standard inventory quantity of the factory for the next week from the standard inventory quantity of the delivery center 3. However, the factor ½ is an example which is determined on the basis that the standard inventory quantity of the delivery center 3 dSI should be an inventory quantity for satisfying shipment quantity for two weeks. Therefore, another value of the factor may be used to determine dES(t+1) and fSI(t+1).

<Process of Calculation of the Standard Inventory Quantity and the Expected Shipment Quantity of the Delivery Center and the Standard Inventory Quantity of the Factory for the Next-Next Week>

Figure 9:
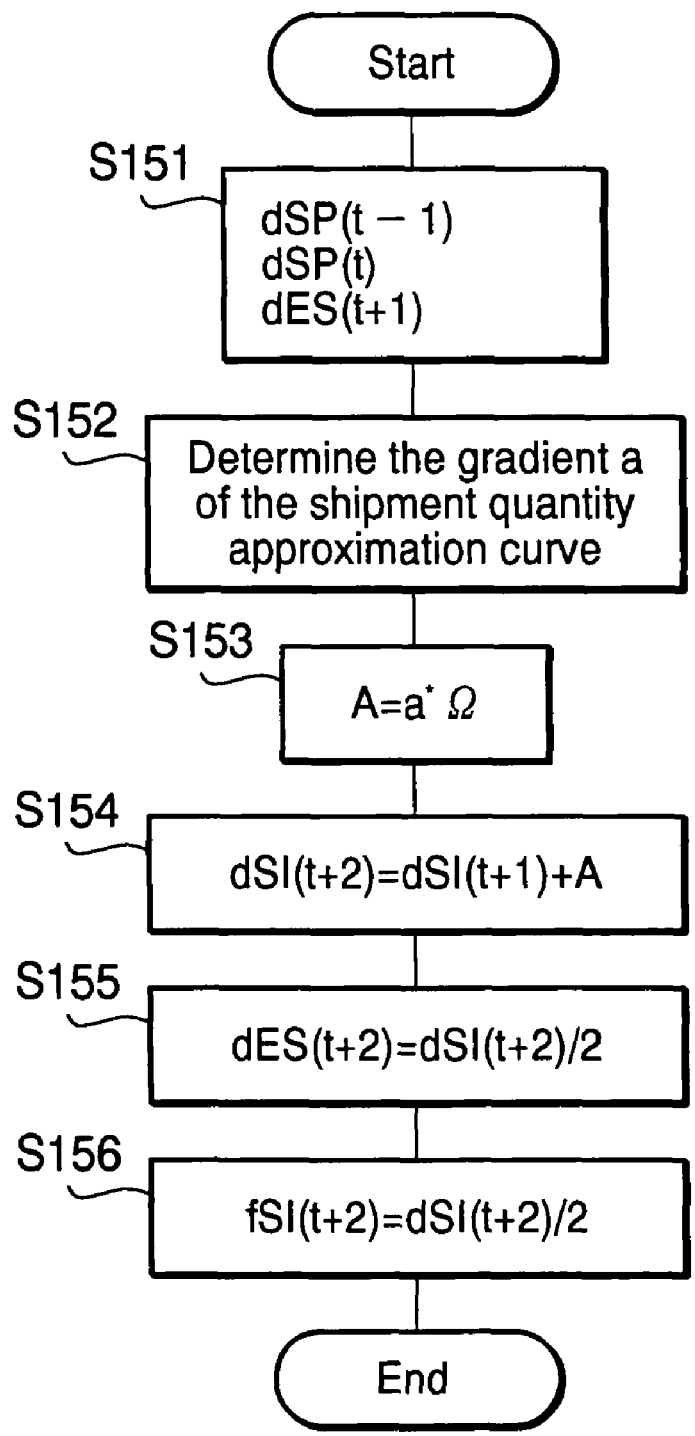
FIG. 9 is a flowchart showing a process of calculation of the standard inventory quantity and the expected shipment quantity of the delivery center and the standard inventory quantity of the factory for the next-next week.

FIG. 9 is a flowchart showing this process. Initially, using the shipment records, dSP(t−1) and dSP(t), of the delivery center 3 for the last week and the current week and the expected shipment quantity, dES(t+1), of the delivery center 3 for the next week (step S151), the gradient "a" at the (t+1)-th week of a shipment quantity approximation curve is determined by the same approximate calculation as that carried out in step S142 of FIG. 8 (step S152). It should be noted that the expected shipment quantity for the next week dES(t+1), which is obtained by the above-described process of FIG. 8, is used to obtain the shipment quantity approximation curve.

The gradient "a" is then multiplied by the factor $\Omega$, which is determined according to a type of each product, to determine the change amount A of the standard inventory quantity (step S153). The standard inventory quantity for the next-next week dSI(t+2) is then determined as the sum of the next week's standard inventory quantity and the change amount A (step S154).

$$dSI(t+2)=dSI(t+1)+A$$

The expected shipment quantity of the delivery center 3 for the next-next week is then determined as ½ of the standard inventory quantity of the delivery center 3 for the next-next week (step S155).

$$dES(t+2)=dSI(t+2)/2$$

Also, the standard inventory quantity of the factory for the next-next week is then determined as ½ of the standard inventory quantity of the delivery center 3 for the next-next week (step S156).

$$fSI(t+2)=dSI(t+2)/2$$

<Process of Calculation of the Standard Inventory Quantity and the Expected Shipment Quantity of the Delivery Center and the Standard Inventory Quantity of the Factory for the Next-Next-Next Week>

Figure 10:
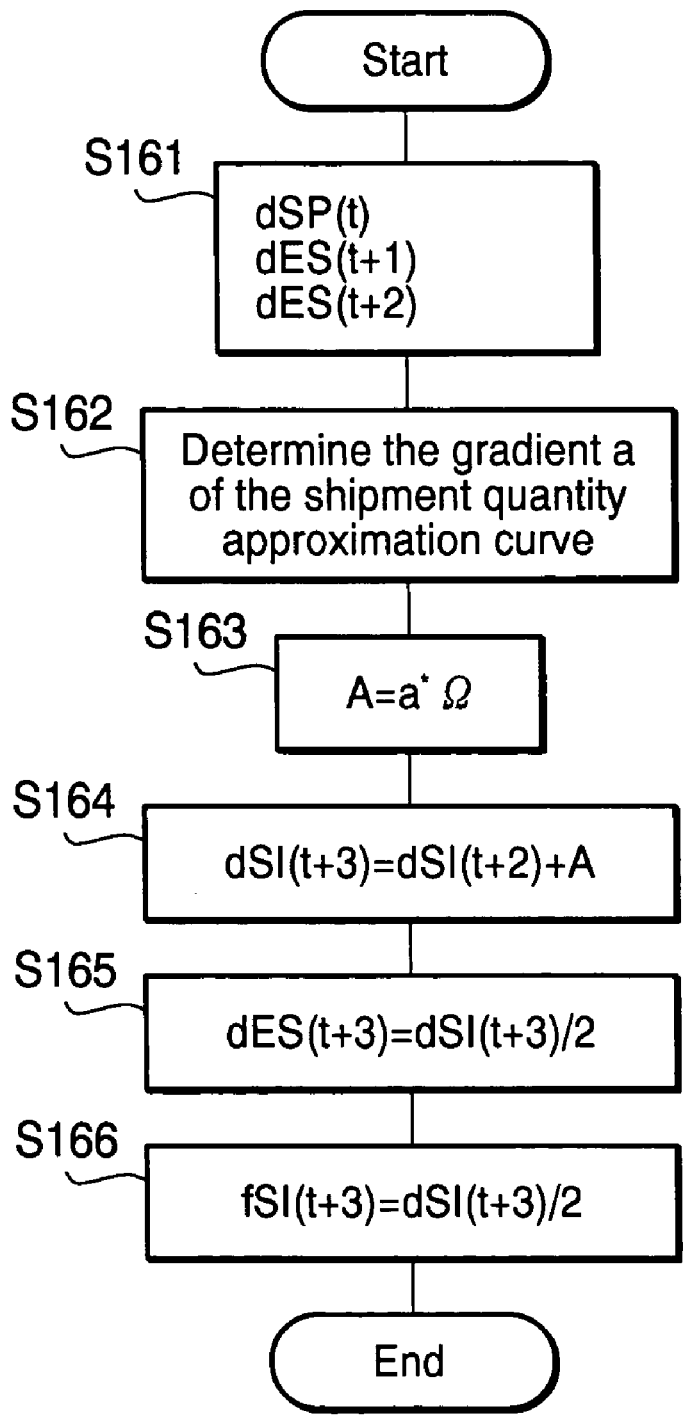
FIG. 10 is a flowchart showing a process of calculation of the standard inventory quantity and the expected shipment quantity of the delivery center and the standard inventory quantity of the factory for the next-next-next week.

FIG. 10 is a flowchart showing this process. Initially, using the shipment record, dSP(t), of the delivery center 3 for the current week and the expected shipment quantities, dES(t+1) and dES(t+2), of the delivery center 3 for the next week and the next-next week (step S161), the gradient "a" at the (t+2)-th week of a shipment quantity approximation curve is determined by the same approximate calculation as that carried out in step S142 (step S162). It should be noted that the expected shipment quantities for the next week and the next-next week, which are obtained by the above-described processes of FIG. 8 and FIG. 9, are used to obtain the shipment quantity approximation curve.

The gradient "a" is then multiplied by the factor $\Omega$, which is determined according to the type of the product, to determine the change amount A of the standard inventory quantity (step S163). The standard inventory quantity for the next-next-next week (i.e., a time point three weeks ahead) is then determined as the sum of the next-next week's standard inventory quantity and the change amount A (step S164).

$$dSI(t+3)=dSI(t+2)+A$$

The expected shipment quantity of the delivery center 3 for the next-next-next week is then determined as ½ of the standard inventory quantity of the delivery center 3 for the next-next-next week (step S165).

$$dES(t+3)=dSI(t+3)/2$$

Also, the standard inventory quantity of the factory for the next-next-next week is then determined as ½ of the standard inventory quantity of the delivery center 3 for the next-next-next week (step S166).

$$fSI(t+3)=dSI(t+3)/2$$

<Process of Calculation of the Shipment Quantity of the Factory for the Next Week>

Figure 11:
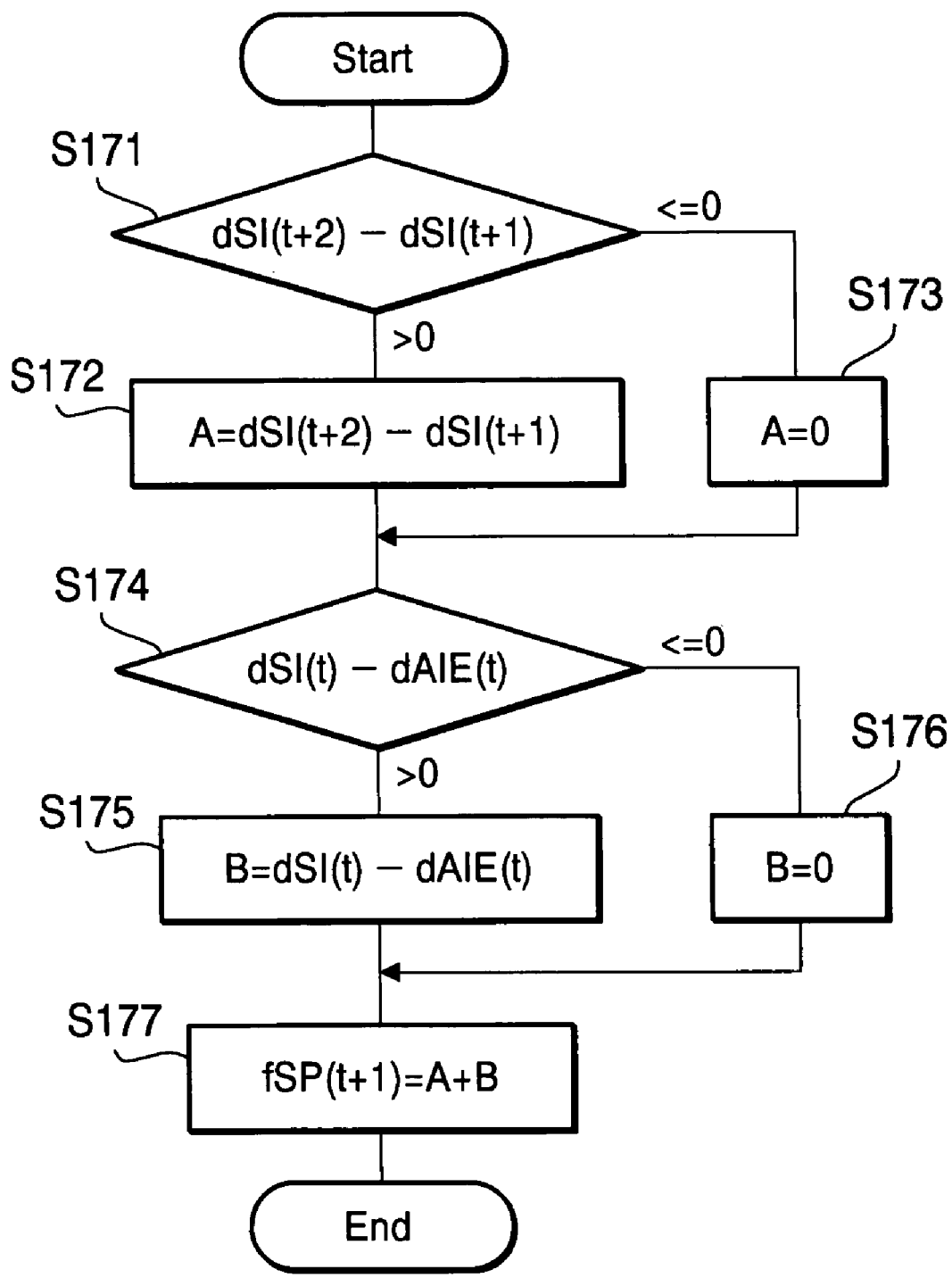
FIG. 11 is a flowchart showing a process of calculation of the shipment quantity of the factory for the next week.

FIG. 11 is a flowchart showing this process. The shipment quantity of the factory for the next week is determined based on the following two standpoints.

(1) The shipment quantity of the factory for the next week determined by this process is supplied to the delivery center 3 at the start of the next-next week. The change amount of the standard inventory quantity of the delivery center 3 before a time at which products shipped by the factory at the (t+1)-th week are restocked to the delivery center 3 is thus taken into consideration (steps S171 to S173).

(2) Next, the restocking that is required to satisfy the standard inventory quantity of the delivery center 3 is taken into consideration. The difference between the standard inventory quantity of the delivery center 3 and the actual inventory quantity of the delivery center 3 is thus determined (steps S174 to S176).

More specifically, the change amount of the standard inventory quantity of the delivery center 3 before the time at which the products shipped by the factory at the (t+1)-th week are restocked in the delivery center 3 is determined as follows (S171).

$$dSI(t+2)-dSI(t+1)$$

If the standard inventory quantity increases (S171: dSI(t+2)−dSI(t+1)>0), the increment is assigned into the variable A in step S172 and is thereby reflected in next week's shipment quantity. On the other hand, if the change of the standard inventory quantity is zero or negative, (S171: dSI(t+2)−dSI(t+1)<=0), the variable A is set equal to 0 so that the change will not be reflected in the next week's shipment quantity (S173).

Then, in step S174, the difference between the standard inventory quantity of the delivery center 3 and the actual inventory quantity of the delivery center 3 is determined as follows.

$$dSI(t)-dAIE(t)$$

If dSI(t)−dAIE(t)>0 and therefore the restocking is necessary, the difference is assigned to the variable B (S175).

$$B=dSI(t)-dAIE(t)$$

On the other hand, if dSI(t)−dAIE(t)<=0 and therefore the restocking is not necessary, B is set equal to 0 (S176). In step S177, the sum of the variables A and B determined in the above manner is determined as the shipment quantity of the factories for the next week.

$$fSP(t+1)=A+B$$

<Process of Calculation of the Expected Assembly Quantity of the Factory for the Next-Next Week>

Figure 12:
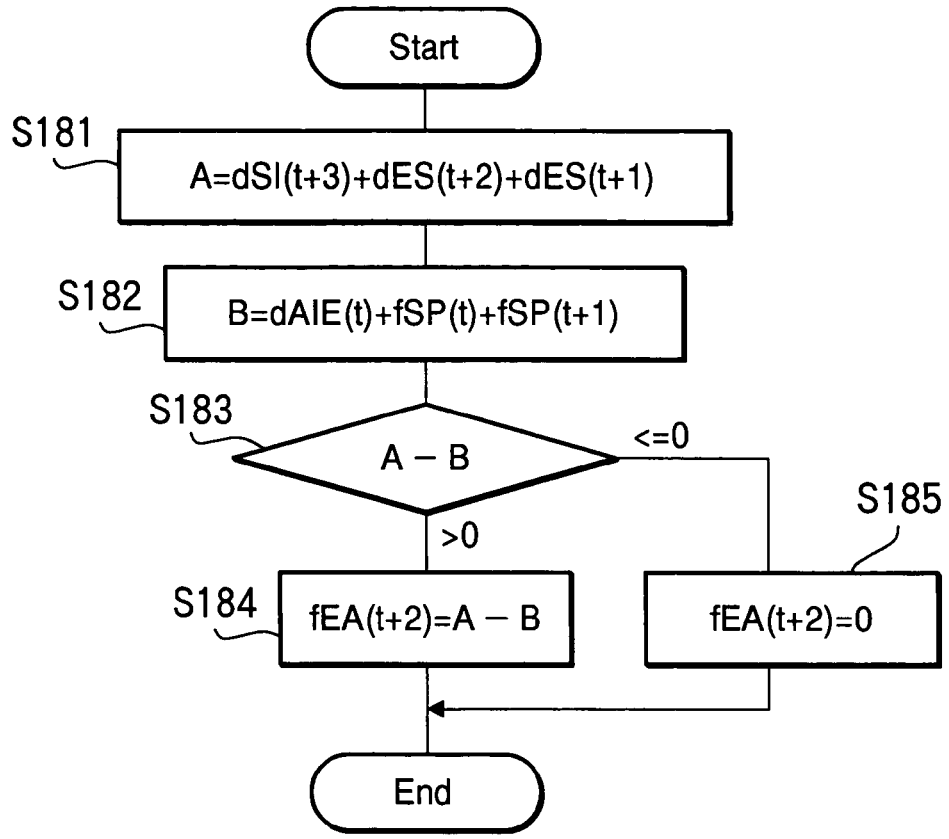
FIG. 12 is a flowchart showing a process of calculation of the expected assembly quantity of the factory for the next-next week.

FIG. 12 is a flowchart showing this process. The expected assembly quantity of the factory for the next-next week is determined based on the following standpoints. The products that are shipped on the next-next week ((t+2)-th week) are restocked in the delivery center 3 on the following week (i.e., the (t+3)-th week). Therefore, the quantity required of the delivery center 3 before a time point at which the products shipped on the next-next week by the factory are restored in the delivery center 3 is determined as the sum of the next-next-next week's standard inventory quantity of the delivery center 3, the next-next week's expected shipment quantity of the delivery center 3, and the next week's expected shipment quantity of the delivery center 3 (step S181).

$$A = dSI(t+3) + dES(t+2) + dES(t+1)$$

Next, the quantity of products that is restored to the delivery center 3 before a time point at which the products shipped on the next-next week by the factory are supplied to the delivery center 3 is determined as the sum of the actual inventory quantity of the delivery center 3 for the end of the current week, the current week's shipment quantity of the factory, and the next week's shipment quantity of the factory (step S182):

$$B = dAIE(t) + fSP(t) + fSP(t+1)$$

Next, A−B is calculated (step S183), and if A−B>0, the quantity corresponding to the difference:

$$fEA(t+2) = A - B$$

is determined as the next-next week's expected assembly quantity of the factory (S184). If A−B≦0, the next-next week's expected assembly quantity of the factory is set to 0 (S185).

<Process of Calculation of the Adjustment Assembly Quantity of the Factories for the Next Week>

Figure 13:
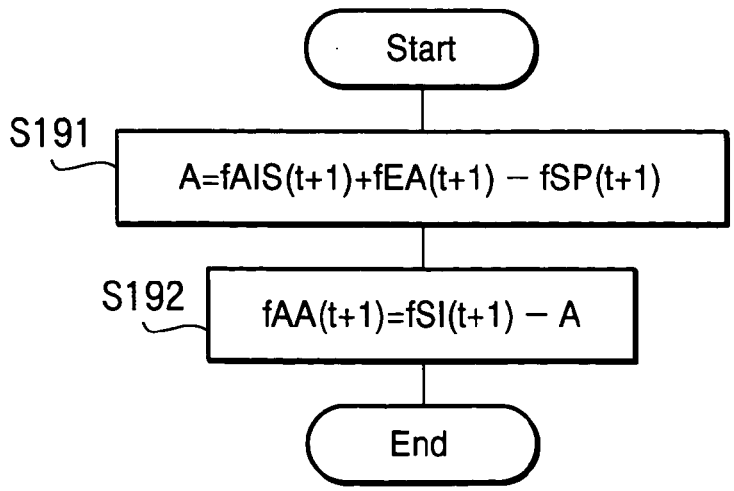
FIG. 13 is a flowchart showing a process of calculation of the adjustment assembly quantity of the factories for the next week.

FIG. 13 is a flowchart showing this process. In this process, the adjustment assembly quantity for the next week fAA(t+1) for adjusting the next week's (the (t+1)-th week's) expected assembly quantity fEA(t+1) of the factory, which has been obtained in the above-described process of calculation of the expected assembly quantity of the factory for the next-next week (FIG. 12) at the stage of the (t−1)-th week, is calculated.

That is, after the actual inventory quantity and the actual shipment quantity for the (t+1)-th week have been determined, the amount of remaining products A is determined by subtracting the actual shipment quantity of the factory for the (t+1)-th week from the sum of the actual inventory quantity and the expected assembly quantity of the factory for the (t+1)-th week is calculated as follows (step S191).

$$A = fAIS(t+1) + fEA(t+1) - fSP(t+1)$$

The remaining quantity A and the standard inventory quantity of the factory for that week (the (t+1)-th week) are then compared and the amount of excess or the amount of deficiency is determined as the next week's adjustment assembly quantity fAA(t+1) (step S192).

$$fAA(t+1) = fSI(t+1) - A$$

<Process of Calculation of the Total Assembly Quantity of the Factory for the Next Week>

Figure 14:
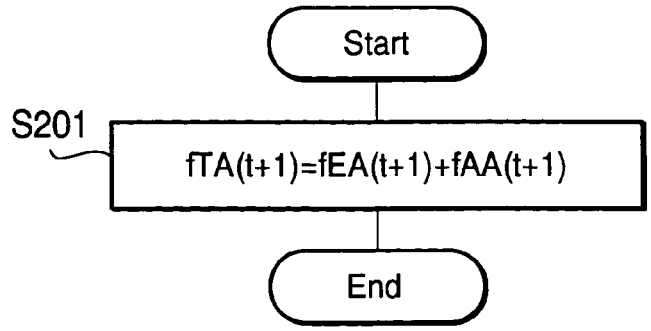
FIG. 14 is a flowchart showing a process of calculation of the total assembly quantity of the factory for the next week.

FIG. 14 is a flowchart showing this process. The next week's adjustment assembly quantity fAA(t+1) has been determined by the above-described process of calculation of the adjustment assembly quantity of the factory for the next week (FIG. 13). Therefore, the total assembly quantity fTA(t+1) of the factory for the next week is determined as the sum of the expected assembly quantity of the factory and the adjustment assembly quantity of the factory for the next week (step S201).

$$fTA(t+1) = fEA(t+1) + fAA(t+1)$$

<Process of Calculation of the Actual Inventory Quantity (for the End of the Current Week) of the Factory>

Figure 15:
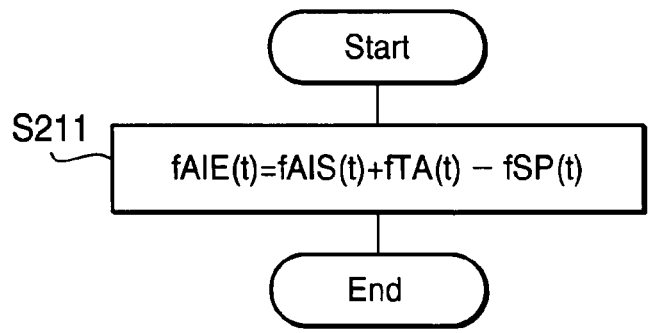
FIG. 15 is a flowchart showing a process of calculation of the actual inventory quantity of the factory for the end of the current week.

FIG. 15 is a flowchart showing this process. The current week's (t-th week's) actual inventory quantity fAIE(t) of the factory is determined by subtracting the current week's shipment quantity of the factory from the sum of the actual inventory quantity of the factory at the start of the week and the current week's total assembly quantity (step S211).

$$fAIE(t) = fAIS(t) + fTA(t) - fSP(t)$$

<Process of Calculation of the Actual Inventory Quantity (Start of Week) of the Factory>

Figure 16:
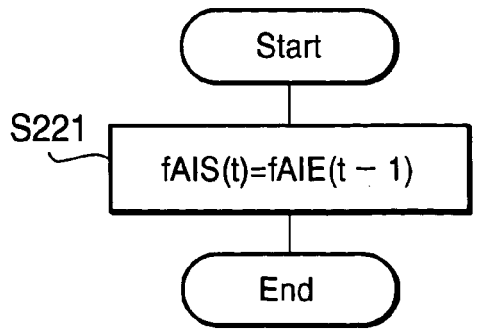
FIG. 16 is a flowchart showing a process of calculation of the actual inventory quantity of the factory for the start of the week.

FIG. 16 is a flowchart showing this process. Since the actual inventory quantity fAIS (t) of the factory is the same as the actual inventory quantity of the factory at the end of the last week, fAIS(t) is determined as follows (step S221).

$$fAIS(t) = fAIE(t-1)$$

It is understood that since the actual inventory quantity fAIS(t+1) of the factory for the start of next week is the actual inventory quantity fAIE(t) of the factory at the end of the current week, the most recent actual inventory quantity of the factory can be reflected in the next week's adjustment assembly quantity fAA(t+1).

That is, by correcting the expected assembly quantity fEA(t+1) of the factory for the next week, which has been calculated at the previous week, by the most recent factory inventory quantity fAIE(t), a highly accurate total assembly quantity for the next week fTA(t+1), which takes into consideration the time lag of the restocking of the products as well, can be determined relatively easily.

The example of the result of the simulation shown in FIG. 2 is calculated according to the above mentioned calculation processes indicated in FIGS. 5-16. If t-th week indicated in a table shown in FIG. 2 is an initial week (zero-th week), the standard inventory quantity for the t-th week can not be determined by the simulation. Therefore, an initial standard inventory quantity may be predetermined based on the production planning. Table 1 shows an example of the initial standard inventory quantity of each product predetermined based on the production planning of an optical-instruments maker.

TABLE 1

| Product category | Initial standard inventory quantity |
| --- | --- |
| Single-lens reflex camera | 300 |
| Compact camera | 1000 |
| Compact zoom camera | 1500 |
| Digital camera | 2000 |
| Lens | 50 |
| Accessories | 0 |
| Digital camera accessories | 500 |
| Binoculars | 300 |
| Telescope | 100 |
| Others | 0 |

The process of determining the shipment quantity approximation curve, which is carried out in steps S142 and S143 in the process of FIG. 8, will be described in detail. First, an approximate curve is determined based on a linear approximate curve of second order indicated below and the shipment records for three past consecutive weeks.

$$y = \alpha x^2 + \beta x + \gamma$$

The gradient "a" is determined by differentiate the above equation with respect to x:

$$y' = 2\alpha x + \beta$$

where a=2α.

The change value A is then obtained by multiplying "a" by the factor Ω.

$$A=2\alpha \times \Omega$$

The standard inventory quantity dSI(t+1) for the next week is then determined by adding the change value A to the current week's standard inventory quantity dSI(t):

$$dSI(t+1)=dSI(t)+A$$

Similarly to the above mentioned way, the approximate curves are obtained in step S152 of the process of FIG. 9 and in step S162 of the process of FIG. 10.

Figure 17:
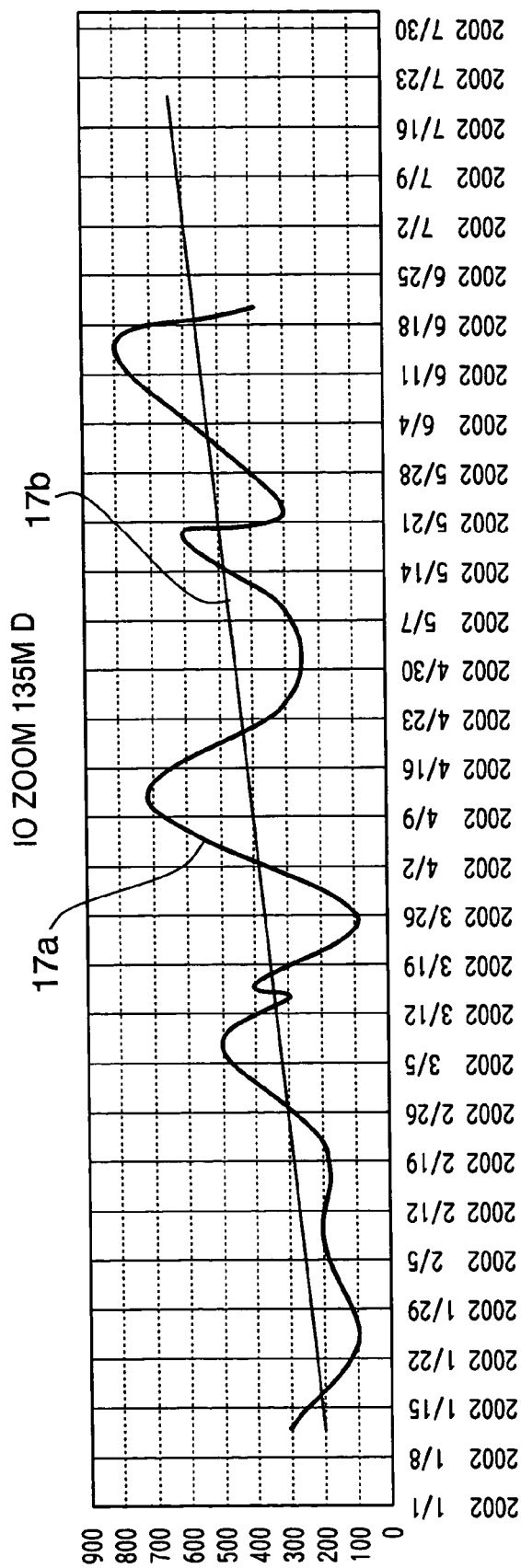
FIG. 17 is a graph illustrating an example of a shipment amount variation and an approximation curve of the shipment amount variation.

FIG. 17 is a graph illustrating an example of a shipment amount variation (a curve 17a) and an approximation curve 17b of the shipment amount variation 17a obtained according to the above mentioned way. In FIG. 17, a horizontal axis represents dates on a weekly basis, and a vertical axis represents the shipment quantity.

FIGS. 18, 19 and 20 represent three examples of the results of the simulation. FIGS. 18, 19 and 20 show three typical examples with regard to a variation of the standard inventory quantity.

FIG. 18 is an example of the result of the simulation in which the standard inventory quantity does not change. FIG. 19 is an example of the result of the simulation in which the standard inventory quantity monotonously increases. More specifically, the standard inventory quantity of the delivery center 3 monotonously increases by 100.

FIG. 20 is an example of the result of the simulation in which the standard inventory quantity monotonously decreases. More specifically, the standard inventory quantity of the delivery center 3 monotonously decreases by 200. In the examples of FIGS. 18-20, the shipment quantities of the delivery center 3 are set 65% of the standard inventory quantities of the delivery center 3.

Next, a variation of values of the result of the simulation will be explained in detail with reference to the example of FIG. 19. Here, a case where the simulation is carried out at the (t+2)-th week will be considered. That is, the column of the (t+2)-th week of a table shown in FIG. 19 is considered as the current week (t-th week).

By the above-described process of calculation of the shipment quantity of the delivery center 3 (FIG. 5), the shipment quantity of the delivery center 3 for the current t-th week (for the column of the (t+2)-th week in FIG. 19) is determined as follows.

$$dSP(t)=845$$

Next, by the above-described process of calculation of the actual inventory quantity of the delivery center 3 for the end of the week (FIG. 6), the actual inventory quantity of the delivery center 3 is determined as follows.

$$dAIE(t)=1070-845=225$$

Next, by the process of FIG. 7 (calculation of the actual inventory quantity for the start of the next week of the delivery center), the actual inventory quantity for the start of the next week of the delivery center 3 is determined as follows.

$$dAIS(t+1)=225+1045=1270$$

Next, by the process of FIG. 8 (calculation of the standard inventory quantity and expected shipment quantity of the delivery center 3 and the standard inventory quantity of the factories for the next week), the next-week's standard inventory quantity of the delivery center 3 is determined as follows when it is determined that the change amount A is 100 (A=100) by multiplying the gradient "a" obtained based on the shipment records dSP (715, 780, 845) of the delivery center 3 for the past three weeks by the factor Ω.

$$dSI(t+1)=1300+100=1400$$

Also, the next week's expected shipment quantity of the delivery center 3 is determined as follows.

$$dES(t+1)=1400/2=700$$

Further, the next week's standard inventory quantity of the factory is determined as follows:

$$fSI(t+1)=1400/2=700$$

Next, by the process of FIG. 9 (calculation of the standard inventory quantity and expected shipment quantity of the delivery center 3 and the standard inventory quantity of the factories for the next-next week), the next-next week's standard inventory quantity of the delivery center 3 is determined as follows when it is determined that the change amount A is 100 (A=100) by multiplying the gradient "a", which is obtained based on the shipment records dSP of the delivery center 3 for the past two weeks and the next week's expected shipment quantity of the delivery center 3 (780, 845, 700), by the factor Ω.

$$dSI(t+2)=1400+100=1500$$

Also, the next-next week's expected shipment quantity of the delivery center 3 is determined as follows.

$$dES(t+2)=1500/2=750$$

Further, the next-next week's standard inventory quantity of the factory is determined as follows.

$$fSI(t+2)=1500/2=750$$

Next, by the process of FIG. 10 (calculation of the standard inventory quantity and expected shipment quantity of the delivery center 3 and the standard inventory quantity of the factories for the next-next-next week), the next-next-next week's standard inventory quantity of the delivery center 3 is determined as follows when it is determined that the change amount A is 100 (A=100) by multiplying the gradient "a", which is obtained based on the shipment record dSP of the delivery center 3 for the current week and the next week's and the next-next week's expected shipment quantities (845, 700, 750), by the factor Ω.

$$dSI(t+3)=1500+100=1600$$

Also, the next-next-next week's expected shipment quantity of the delivery center 3 is determined as follows.

$$dES(t+3)=1600/2=800$$

Further, the next-next-next week's standard inventory quantity of the factory is determined as follows.

$$fSI(t+3)=1600/2=800$$

Next, by the process of FIG. 11 (calculation of the shipment quantity of the factories for the next week), the next week's factory shipment quantity is determined as follows.

$$A=dSI(t+2)-dSI(t+1)=1500-1400=100$$

$$B=dSI(t)-dAIE(t)=1300-225=1075$$

$$fSP(t+1)=A+B=100+1075=1175$$

Next, by the process of FIG. 12 (calculation of the expected assembly quantity of the factories for the next-next week), the next-next week's expected assembly quantity is determined as follows.

$$A=dSI(t+3)+dES(t+2)+dES(t+1)=1600+750+700=3050$$

$$B=dAIE(t)+fSP(t)+fSP(t+1)=225+1045+1175=2445$$

$$fEA(t+2)=A-B=3050-2445=605$$

Next, by the process of FIG. 13 (calculation of the adjustment assembly quantity of the factories for the next week), the next week's adjustment assembly quantity is determined as follows.

$$A=fAIS(t+1)+fEA(t+1)-fSP(t+1)=650+735-1175=210$$

$$fAA(t+1)=fSI(t+1)-A=700-210=490$$

Then, by the process of FIG. 14 (calculation of the total assembly quantity of the factories for the next week), the next week's total assembly quantity of the factories is determined as follows.

$$fTA(t+1)=fEA(t+1)+fAA(t+1)=735+490=1225$$

It can be thus understood that the numerical values shown in FIG. 19 correspond to the results of the above-described processes.

As described above, the variation of the shipment quantity of the delivery center 3 can be predicted, and therefore the standard assembly quantity of the factory for the next-next week can be predicted based on the predicted variation of the shipment quantity.

The following merits are provided by predicting the expected assembly quantity in this manner.

1) By determining the expected assembly quantities for the next-next week based on the current week's records, production and packaging schedules for the next-next week can be prepared.

2) By using expected shipment quantities, future expected assembly quantities can be obtained, and therefore assembly simulations can be executed at the factory side. Feedback to the ordering of components that have a relatively long lead time can be made possible by such assembly simulations.

3) Since future assembly quantities can be seen in advance, feedback on information to the load-leveling of work on production lines can be made.

In regard to the results obtained by the above-described simulation, the following rules for manually changing data of the result of the simulation may be adopted.

1) In the case of a new product, the factory shipment quantities are determined manually until the inventory quantity reaches the standard inventory quantity in the delivery center 3.

2) The shipment quantity of the delivery center 3 is set below 65% of the standard inventory quantity of the delivery center 3.

3) The standard inventory quantity of the delivery center 3 can be changed in accordance with human decisions. By introducing such rules to the result of the simulation, new products, special orders, etc., can be supported with flexibly.

FIG. 21 schematically shows a configuration of a system for managing production quantity according to the embodiment of the invention. The above mentioned simulation is performed at the management site 300 using information gathered from the factories A, B and C and the delivery center 3. It should be noted that the workstation (not shown) located in the management site 300 has a network interface (not shown) to communicate with databases (311, 312, 313 and 315) of the factories and the delivery center 3.

The factories A, B and C respectively have databases 311, 312 and 313, each of which contains a site shipment record table relating to the shipment record of each factory and an inventory record table relating to the inventory record of each factory. Also, the delivery center 3 has the database 315 containing a site shipment record table relating to the shipment record of the delivery center 3 and an inventory record table relating to the inventory record of the delivery center 3.

Information contained in the databases (311,312,313,315) is gathered and stored into a database 305 of the management site 300 at the end of each week. The data base 305 may be constructed in a hard disk drive of the workstation located in the management site 300. As shown in FIGS. 21 and 22, the database 305 contains an analysis table 401, a site master 402, a proportion master 403, a product master 404, a categorization master 405, an inventory table 406, an inventory record table 407 and a site shipment record table 408.

As shown in FIG. 22, these tables and masters include items of data listed below.

Analysis Table 401: site code, product code, year/week, standard inventory quantities, shipment quantities, expected shipment quantities, expected assembly quantities, adjustment assembly quantities.

Site Master 402: site code, site name

Proportion Master 403: Product code, line #, site code, proportions

Product Master 404: Product code, categorization code, product name

Categorization Master 405: categorization codes (product categories), categorization names, initial standard inventory quantities, factors ($\Omega$)

Inventory Table 406: site code, year/week, product code, start-of-week inventory quantities, end-of-week inventory quantities Inventory Record Table 407: site code, year/week, product code, inventory quantities Site Shipment Record Table 408: site code, year/week, product code, shipment quantities The analysis table 401 is a main table and is prepared for each of the sites including factories and the delivery center 3. The standard inventory quantities, shipment quantities, expected shipment quantities, expected assembly quantities, and adjustment assembly quantities, which are the result of the simulation, are stored into the analysis table 401 for each of the sites. It should be noted that, in the analysis table 401, an item of the total assembly quantity is not contained because it can be determined as the sum of the expected assembly quantities and the adjustment assembly quantities.

In FIG. 22, items, which are related to each other, are connected by lines. For example, a site name of a site code of the analysis table 401 is obtained by consulting the site master 402. Similarly, details of the product code of the analysis table 401 are obtained by consulting the product master 404, and details of the categorization code of the product master 404 are obtained by consulting the categorization master 405.

In the inventory table 406, an inventory record table 407 and the site shipment record table 408, records transmitted form the sites including the factories and the delivery center 3 are stored and are related to the analysis table 401.

The proportion master 403 is used in a case where a certain product is produced by a plurality of factories. For example, by using the proportion master 403, the simulation can be performed so as to obtain simulation results of the product A for different factories A and B.

FIG. 23 shows an example of the simulation results relating to a product A having a product code 10460. In the example of FIG. 23, the simulation is performed so that 80% of the product A is produced by the factory A and 20% of the product A is produced by the factory B.

FIGS. 24-26 show examples of contents of the tables and masters. In FIG. 24, examples of the site shipment record table 408, the site master 402, the proportion master 403 and the inventory table 406 are indicated. When the proportion master 403 is constructed as shown in FIG. 24, the product having a product code 10460 is produced by the production line #1 of the factory having a site code 18021 and by the production line #2 of the factory having a site code 18031 in proportions of 20% and 80%, respectively.

In FIG. 25, examples of the product master 404 and the categorization master 405 are indicated. In FIG. 26, the analysis table 401 is indicated. As shown in FIG. 26, the expected assembly quantities (a column 501) and adjustment assembly quantities (a column 502) and the total assembly quantities which are determined as the sums of the above quantities are sent to the respective sites (factories or the delivery center).

Although the present invention has been described in considerable detail with reference to certain preferred embodiments thereof, other embodiments are possible.

For example, although, in the above mentioned embodiment, the management site 300 that carries out the simulation is located in the delivery center 3, the management site 300 and the delivery center 3 are not required to be located in the same site as can be seen from the system configuration shown in FIG. 21.

For example, a variation, in which the management site 300 is located in a home office of a maker and the operation of the delivery center 3 is carried out by another company, can be accomplished.

In the above mentioned embodiment, the standard inventory quantities for three future weeks are obtained by the simulation by way of example. However, the standard inventory quantities for various numbers of future weeks can be obtained by a way similar to the above mentioned simulation.

In the above mentioned embodiment, the simulation is carried out on a weekly basis. This is based on a fact that, in general, commodities sell well at weekends. However, the simulation may be carried out at various types of intervals, for example, hourly, daily or monthly.

In the above mentioned embodiment, the factories, the delivery center 3 and the customers are in the relationship of $N_1:1:N_2$. However, the number of factories or customers may be one.

As described above according to the embodiment of the invention, the inventory can be gathered at a single delivery center 3, and the number of the inventory in the delivery center 3 can be kept at a minimum level. Since the inventory of the delivery center 3 can be kept minimum, the system according to the embodiment can respond speedily to fluctuations in exchange rate.

The present disclosure relates to the subject matter contained in Japanese Patent Application No. P2003-033014, filed on Feb. 10, 2003, which is expressly incorporated herein by reference in its entirety.

What is claimed is:

1. A method of managing production quantity in a distribution system where products shipped from at least one factory are stocked in a single delivery center at every predetermined cycle and then supplied to customers from the single delivery center, the method being performed by execution of computer readable program code by at least one processor of at least one computer system and comprising:

determining, using at least one of the processors, a standard inventory quantity of products to be stocked in the single delivery center for a time of at least one predetermined future cycle based on a shipment record of the single delivery center, the determining a standard inventors quantity including:

determining, using at least one of the processors, a first approximation curve of variations of a shipment quantity of the single delivery center based on the shipment record of the single delivery center, determining a gradient of the shipment quantity of the single delivery center for a current cycle t based on the determined approximation curve, and determining a (t+1)-th cycle standard inventory quantity of the single delivery center based on the determined gradient;

determining, using at least one of the processors, a second approximation curve of variations of a shipment quantity of the single delivery center based on the shipment record of the single delivery center and said (t+1)-th cycle expected shipment quantity of the single delivery center;

determining a gradient of the shipment quantity of the single delivery center for the (t+1)-th cycle based on the determined second approximation curve;

determining a (t+2)-th cycle standard inventory quantity of the single delivery center based on the determined gradient for the (t+1)-th cycle;

determining a (t+2)-th cycle expected shipment quantity of the single delivery center and a (t+2)-th cycle standard inventory quantity of the at least one factory based on said determined (t+2)-th cycle standard inventory quantity of the single delivery center;

wherein said (t+2)-th cycle standard inventory quantity of the single delivery center dSI(t+2) is determined for each product according to:

$$dSI(t+2)=dSI(t+1)+b\times\Omega$$

where "dSI(t+1)" represents said (t+1)-th cycle standard inventory quantity of the single delivery center, "b" represents the determined gradient for the (t+1)-th cycle, and $\Omega$ represents a factor which is predetermined according to a product type;

determining a (t+1)-th cycle shipment quantity of the at least one factory based on said (t+2)-th cycle standard inventory quantity of the single delivery center, said (t+1)-th cycle standard inventory quantity of the single delivery center, an actual inventory quantity of the single delivery center for an end of the current cycle t, and a standard inventory quantity of the single delivery center for the current cycle t;

determining, using at least one of the processors, a third approximation curve of variations of the shipment quantity of the single delivery center based on said (t+1)-th cycle and (t+2)-th cycle expected shipment quantities of the single delivery center;

determining a gradient of the shipment quantity of the single delivery center for the (t+2)-th cycle based on the determined third approximation curve;

determining a (t+3)-th cycle standard inventory quantity of the single delivery center based on the determined gradient for the (t+2)-th cycle;

determining a (t+3)-th cycle expected shipment quantity of the single delivery center and a (t+3)-th cycle standard inventory quantity of the at least one factory based on said determined (t+3)-th cycle standard inventory quantity of the single delivery center;

wherein said (t+3)-th cycle standard inventory quantity of the single delivery center dSI(t+3) is determined for each product according to:

$$dSI(t+3)=dSI(t+2)+c\times\Omega$$

where "c" represents the determined gradient for the (t+2)-th cycle;

determining a (t+2)-th cycle expected assembly quantity of the at least one factory based on said (t+3)-th cycle standard inventory quantity of the single delivery center, said (t+1)-th cycle expected shipment quantity of the single delivery center, said (t+2)-th cycle expected shipment quantity of the single delivery center, said actual inventory quantity of the single delivery center for the end of the current cycle t, said determined (t+1)-th cycle shipment quantity of the at least one factory, and a shipment quantity of the at least one factory for the current cycle t;

determining, using at least one of the processors, a total assembly quantity of products to be assembled by the at least one factory for a time of at least one future predetermined cycle based on said determined standard inventory quantity of the single delivery center and an actual inventory quantity of the at least one factory;

determining an (t+1)-th cycle expected shipment quantity of the single delivery center based on said determined (t+1)-th cycle standard inventory quantity of the single delivery center and determining a (t+1)-th cycle standard inventory quantity of the at least one factory based on said determined (t+1)-th cycle standard inventory quantity of the single delivery center;

wherein each of said (t+1)-th cycle expected shipment quantity of the single delivery center and said (t+1)-th cycle standard inventory quantity of the at least one factory is determined by multiplying said (t+1)-th cycle standard inventory quantity of the single delivery center by a factor.

2. The method according to claim 1,
wherein the at least one factory includes a plurality of factories that produce the same product,
wherein, with regard to the same product, said total assembly quantity is determined for each of the plurality of factories according a predetermined production proportion.

3. The method according to claim 1,
wherein said determining a standard inventory quantity includes:
determining an approximation curve of variations of a shipment quantity of the single delivery center based on the shipment record of the single delivery center; and
determining said standard inventory quantity of the single delivery center for the time one or more predetermined future cycles based on the determined approximation curve.

4. The method according to claim 1,
wherein said (t+1)-th cycle standard inventory quantity of the single delivery center dSI(t+1) is determined for each product according to:

$$dSI(t+1)=dSI(t)+a\times\Omega$$

where "dSI(t)" represents a standard inventory quantity for a current cycle t, "a" represents the determined gradient, and $\Omega$ represents a factor which is predetermined according to a product type.

5. The method according to claim 1, wherein the factor is ½.

6. The method according to claim 1, further comprising:
determining a (t+1)-th cycle total assembly quantity of the at least one factory by adding a (t+1)-th cycle adjustment assembly quantity determined based on the actual inventory quantity of the at least one factory to a (t+1)-th cycle expected assembly quantity of the at least one factory which has been determined at a (t−1)-th cycle.

7. The method according to claim 1, further comprising:
determining an actual inventory quantity of the at least one factory for a start of the (t+1)-th cycle based on an actual inventory quantity of the at least one factory for an end of the current cycle t;
determining a (t+1)-th cycle adjustment assembly quantity based on said (t+1)-th cycle standard inventory quantity of the at least one factory, a (t+1)-th cycle expected assembly quantity of the at least one factory which has been determined at the (t−1)-th cycle, said determined actual inventory quantity of the at least one factory for the start of the (t+1)-th cycle, and said (t+1)-th cycle shipment quantity of the at least one factory; and
determining a (t+1)-th cycle total assembly quantity of the at least one factory by adding said (t+1)-th cycle adjustment assembly quantity to said (t+1)-th cycle expected assembly quantity of the at least one factory.

8. The method according to claim 1, wherein the predetermined cycle is a week.

9. A computer program product, embodied on a computer readable storage medium, to be executed by a computer to perform a method of managing production quantity in a distribution system where products shipped from at least one factory are stocked in a single delivery center at every predetermined cycle and then supplied to customers from the single delivery center, the method comprising:

determining a standard inventory quantity of products to be stocked in the single delivery center for a time of at least one predetermined future cycle based on a shipment record of the single delivery center the determining a standard inventors quantity including:

determining a first approximation curve of variations of a shipment quantity of the single delivery center based on the shipment record of the single delivery center, determining a gradient of the shipment quantity of the single delivery center for a current cycle t based on the determined approximation curve and determining a (t+1)-th cycle standard inventory quantity of the single delivery center based on the determined gradient;

determining a second approximation curve of variations of a shipment quantity of the single delivery center based on the shipment record of the single delivery center and said (t+1)-th cycle expected shipment quantity of the single delivery center;

determining a gradient of the shipment quantity of the single delivery center for the (t+1)-th cycle based on the determined second approximation curve;

determining a (t+2)-th cycle standard inventory quantity of the single delivery center based on the determined gradient for the (t+1)-th cycle;

determining a (t+2)-th cycle expected shipment quantity of the single delivery center and a (t+2)-th cycle standard inventory quantity of the at least one factory based on said determined (t+2)-th cycle standard inventory quantity of the single delivery center;

wherein said (t+2)-th cycle standard inventory quantity of the single delivery center dSI(t+2) is determined for each product according to:

$$dSI(t+2)=dSI(t+1)+b\times\Omega$$

where "dSI(t+1)" represents said (t+1)-th cycle standard inventory quantity of the single delivery center, "b" represents the determined gradient for the (t+1)-th cycle, and Ω represents a factor which is predetermined according to a product type;

determining a (t+1)-th cycle shipment quantity of the at least one factory based on said (t+2)-th cycle standard inventory quantity of the single delivery center, said (t+1)-th cycle standard inventory quantity of the single delivery center, an actual inventory quantity of the single delivery center for an end of the current cycle t, and a standard inventory quantity of the single delivery center for the current cycle t;

determining a third approximation curve of variations of the shipment quantity of the single delivery center based on said (t+1)-th cycle and (t+2)-th cycle expected shipment quantities of the single delivery center;

determining a gradient of the shipment quantity of the single delivery center for the (t+2)-th cycle based on the determined third approximation curve;

determining a (t+3)-th cycle standard inventory quantity of the single delivery center based on the determined gradient for the (t+2)-th cycle;

determining a (t+3)-th cycle expected shipment quantity of the single delivery center and a (t+3)-th cycle standard inventory quantity of the at least one factory based on said determined (t+3)-th cycle standard inventory quantity of the single delivery center;

wherein said (t+3)-th cycle standard inventory quantity of the single delivery center dSI(t+3) is determined for each product according to:

$$dSI(t+3)=dSI(t+2)+c\times\Omega$$

where "c" represents the determined gradient for the (t+2)-th cycle;

determining a (t+2)-th cycle expected assembly quantity of the at least one factory based on said (t+3)-th cycle standard inventory quantity of the single delivery center, said (t+1)-th cycle expected shipment quantity of the single delivery center, said (t+2)-th cycle expected shipment quantity of the single delivery center, said actual inventory quantity of the single delivery center for the end of the current cycle t, said determined (t+1)-th cycle shipment quantity of the at least one factory, and a shipment quantity of the at least one factory for the current cycle t;

determining an assembly quantity of products to be assembled by the at least one factory for a time of at least one predetermined future cycle based on said determined standard inventory quantity and an actual inventory quantity of the at least one factory; and determining an (t+1)-th cycle expected shipment quantity of the single delivery center based on said determined (t+1)-th cycle standard inventory quantity of the single delivery center and determining a (t+1)-th cycle standard inventory quantity of the at least one factory based on said determined (t+1)-th cycle standard inventory quantity of the single delivery center;

wherein each of said (t+1)-th cycle expected shipment quantity of the single delivery center and said (t+1)-th cycle standard inventory quantity of the at least one factory is determined by multiplying said (t+1)-th cycle standard inventory quantity of the single delivery center by a factor.

10. A production quantity management system for managing production quantity in a distribution system where products shipped from at least one factory are stocked in a single delivery center at every predetermined cycle and then supplied to customers from the single delivery center, the system comprising:

a plurality of storing systems that are respectively located in the single delivery center and the at least one factory to store information concerning an inventory and a shipment of the single delivery center and the at least one factory, respectively; and a managing center that includes:

a calculating system that determines a standard inventory quantity of products to be stocked in the single delivery center for a time of at least one future predetermined cycle based on a shipment record of the single delivery center and the information obtained from said plurality storing system, wherein said calculating system determines:

a first approximation curve of variations of a shipment quantity of the single delivery center based on the shipment record of the single delivery center, determines a gradient of the shipment quantity of the single delivery center for a current cycle t based on the determined approximation curve, and determines a (t+1)-th cycle standard inventory quantity of the single delivery center based on the determined gradient;

determines a second approximation curve of variations of a shipment quantity of the single delivery center based on the shipment record of the single delivery center and said (t+1)-th cycle expected shipment quantity of the single delivery center;

determines a gradient of the shipment quantity of the single delivery center for the (t+1)-th cycle based on the determined second approximation curve;

determines a (t+2)-th cycle standard inventory quantity of the single delivery center based on the determined gradient for the (t+1)-th cycle;

determines a (t+2)-th cycle expected shipment quantity of the single delivery center and a (t+2)-th cycle standard inventory quantity of the at least one factory based on said determined (t+2)-th cycle standard inventory quantity of the single delivery center;

determines said (t+2)-th cycle standard inventory quantity of the single delivery center dSI(t+2) for each product according to:

$$dSI(t+2)=dSI(t+1)+b\times\Omega$$

where "dSI(t+1)" represents said (t+1)-th cycle standard inventory quantity of the single delivery center, "b" represents the determined gradient for the (t+1)-th cycle, and Ω represents a factor which is predetermined according to a product type;

determines a (t+1)-th cycle shipment quantity of the at least one factory based on said (t+2)-th cycle standard inventory quantity of the single delivery center, said (t+1)-th cycle standard inventory quantity of the single delivery center, an actual inventory quantity of the single delivery center for an end of the current cycle t, and a standard inventory quantity of the single delivery center for the current cycle t;

determines a third approximation curve of variations of the shipment quantity of the single delivery center based on said (t+1)-th cycle and (t+2)-th cycle expected shipment quantities of the single delivery center;

determines a gradient of the shipment quantity of the single delivery center for the (t+2)-th cycle based on the determined third approximation curve;

determines a (t+3)-th cycle standard inventory quantity of the single delivery center based on the determined gradient for the (t+2)-th cycle; and determines a (t+3)-th cycle expected shipment quantity of the single delivery center and a (t+3)-th cycle standard inventory quantity of the at least one factory based on said determined (t+3)-th cycle standard inventory quantity of the single delivery center;

determines said (t+3)-th cycle standard inventory quantity of the single delivery center dSI(t+3) for each product according to:

$$dSI(t+3)=dSI(t+2)+c\times\Omega$$

where "c" represents the determined gradient for the (t+2)-th cycle;

determines a (t+2)-th cycle expected assembly quantity of the at least one factory based on said (t+3)-th cycle standard inventory quantity of the single delivery center, said (t+1)-th cycle expected shipment quantity of the single delivery center, said (t+2)-th cycle expected shipment quantity of the single delivery center, said actual inventory quantity of the single delivery center for the end of the current cycle t, said determined (t+1)-th cycle shipment quantity of the at least one factory, and a shipment quantity of the at least one factory for the current cycle t; and a management system that deter mines a total assembly quantity of products to be assembled by the at least one factory for a time of at least one predetermined future cycle based on said determined standard inventory quantity of the single delivery center and an actual inventory quantity of the at least one factory, and that sends the determined total assembly quantity to the at least one factory, wherein said calculating system further determines an (t+1)-th cycle expected shipment quantity of the single delivery center based on said determined (t+1)-th cycle standard inventory quantity of the single delivery center and determines a (t+1)-th cycle standard inventory quantity of the at least one factory based on said determined (t+1)-th cycle standard inventory quantity of the single delivery center, and wherein said calculating system determines each of said (t+1)-th cycle expected shipment quantity of the single delivery center and said (t+1)-th cycle standard inventory quantity of the at least one factory by multiplying said (t+1)-th cycle standard inventory quantity of the single delivery center by a factor.

11. The production quantity management system according to claim 10, wherein the at least one factory includes a plurality of factories, wherein with regard to a predetermined product, said management system determines the total assembly quantity for each of the plurality of factories according a number of the plurality of factories and a predetermined production proportion, and sends the determined total assembly quantities to the respective factories.

12. The production quantity management system according to claim 10, wherein said calculating system determines an approximation curve of variations of a shipment quantity of the single delivery center based on the shipment record of the single delivery center, and determines said standard inventory quantity of the single delivery center for the time one or more predetermined future cycles based on the determined approximation curve.

13. The production quantity management system according to claim 10, wherein said calculating system determines said (t+1)-th cycle standard inventory quantity of the single delivery center dSI(t+1) for each product according to:

$$dSI(t+1)=dSI(t)+a\times\Omega$$

where "dSI(t)" represents a standard inventory quantity for a current cycle t, "a" represents the determined gradient, and $\Omega$ represents a factor which is predetermined according to a product type.

14. The production quantity management system according to claim 10, wherein the factor is ½.

15. The production quantity management system according to claim 10, wherein said calculating system further determines:

an actual inventory quantity of the at least one factory for a start of the (t+1)-th cycle based on an actual inventory quantity of the at least one factory for an end of the current cycle t;

a (t+1)-th cycle adjustment assembly quantity based on said (t+1)-th cycle standard inventory quantity of the at least one factory, a (t+1)-th cycle expected assembly quantity of the at least one factory which has been determined at the (t−1)-th cycle, said determined actual inventory quantity of the at least one factory for the start of the (t+1)-th cycle, and said (t+1)-th cycle shipment quantity of the at least one factory; and a (t+1)-th cycle total assembly quantity of the at least one factory by adding said (t+1)-th cycle adjustment assembly quantity to said (t+1)-th cycle expected assembly quantity of the at least one factory.

16. The production quantity management system according to claim 10, wherein the predetermined cycle is a week.

17. The production quantity management system according to claim 10, wherein said management center is located in the single delivery center and is connected to the plurality of storing systems located in the at least one factory through a network.

18. The production quantity management system according to claim 10, wherein said management center is located in a site which is different from the at least one factory and the single delivery center, and is connected to the plurality of storing systems located in the at least one factory and the single delivery center through a network.

* * * * *

UNITED STATES PATENT AND TRADEMARK OFFICE
CERTIFICATE OF CORRECTION

| | |
|---|---|
| PATENT NO. | : 7,805,328 B2 |
| APPLICATION NO. | : 10/773239 |
| DATED | : September 28, 2010 |
| INVENTOR(S) | : Yuya Suzuki et al. |

Page 1 of 1

It is certified that error appears in the above-identified patent and that said Letters Patent is hereby corrected as shown below:

Title Page,
At item (75) "Inventors", on page 1, of the printed patent, correct spelling of the name of the 5th inventor to read --Takumi OHTANI-- rather than "Takumi OTANI".

Signed and Sealed this
Twenty-eighth Day of December, 2010

David J. Kappos
*Director of the United States Patent and Trademark Office*